US012714892B2

(12) United States Patent
Baek et al.

(10) Patent No.: US 12,714,892 B2
(45) Date of Patent: Aug. 25, 2026

(54) SHUTTER OPEN-CLOSING APPARATUS, SHUTTER OPEN-CLOSING SYSTEM INCLUDING THE SAME, AND SHUTTER OPEN-CLOSING METHOD

(71) Applicant: SEMES CO., LTD., Cheonan-si (KR)

(72) Inventors: Doohyun Baek, Cheonan-si (KR); Eunsang Yoon, Cheonan-si (KR); Myungjin Lee, Cheonan-si (KR); Chuljun Park, Cheonan-si (KR)

(73) Assignee: Semes Co., LTD., Cheonan-si (KR)

( * ) Notice: Subject to any disclaimer, the term of this patent is extended or adjusted under 35 U.S.C. 154(b) by 371 days.

(21) Appl. No.: 18/524,742

(22) Filed: Nov. 30, 2023

(65) Prior Publication Data

US 2024/0181281 A1 Jun. 6, 2024

(30) Foreign Application Priority Data

Dec. 6, 2022 (KR) ........................ 10-2022-0169112

(51) Int. Cl.
*A62C 2/22* (2006.01)
*A62C 3/00* (2006.01)
*E05F 15/665* (2015.01)

(52) U.S. Cl.
CPC ................ *A62C 2/22* (2013.01); *A62C 3/002* (2013.01); *E05F 15/665* (2015.01)

(58) Field of Classification Search
CPC .......... A62C 2/22; E05F 15/59; E05F 15/665; E05F 15/72; E06B 5/16; E06B 9/56; E05Y 2201/686; E05Y 2800/252; E05Y 2800/346; E05Y 2900/146
See application file for complete search history.

(56) References Cited

U.S. PATENT DOCUMENTS 575,736 A * 1/1897 Rice ........................ E05F 1/006 49/8
6,719,100 B2 * 4/2004 James, Jr. ................ A62C 2/22 414/940
2019/0063144 A1 * 2/2019 Jun ........................... E06B 5/16

FOREIGN PATENT DOCUMENTS

CN 216008310 U 3/2022
EP 3892810 A1 10/2021
JP 2021-001528 A 1/2021
(Continued)

OTHER PUBLICATIONS

Korean Office Action dated Aug. 26, 2024 issued in corresponding Korean Appln. No. 10-2022-0169112.

*Primary Examiner* — William C Doerrler
(74) *Attorney, Agent, or Firm* — Harness, Dickey & Pierce, P.L.C.

(57) ABSTRACT

The disclosure provides a shutter open-closing apparatus capable of improving producibility, assemblability, and maintainability and reducing an operating cost, a shutter open-closing system including the same, and a shutter open-closing method. The shutter open-closing apparatus includes a main body connected to a main door, which is opened and closed, to move along with movement of the main door, a main guide unit coupled to the main body, a shutter pushing unit movable on the main guide unit, a link unit rotatably connected to the shutter pushing unit to move along with movement of the shutter pushing unit, and a shutter connected to the link unit to move along with movement of the link unit, and opened and closed using a driving force for moving the main door.

20 Claims, 18 Drawing Sheets

(56) References Cited

FOREIGN PATENT DOCUMENTS

| | | | |
|---|---|---|---|
| KR | 101612439 | B1 | 4/2016 |
| KR | 102534386 | B1 | 5/2023 |

* cited by examiner

Prior Art

Prior Art

Prior Art

SHUTTER OPEN-CLOSING APPARATUS, SHUTTER OPEN-CLOSING SYSTEM INCLUDING THE SAME, AND SHUTTER OPEN-CLOSING METHOD

CROSS-REFERENCE TO RELATED APPLICATION

This application is based on and claims priority under 35 U.S.C. § 119 to Korean Patent Application No. 10-2022-0169112, filed on Dec. 6, 2022, in the Korean Intellectual Property Office, the disclosure of which is incorporated by reference herein in its entirety.

BACKGROUND

1. Field

The disclosure relates to a shutter open-closing apparatus for blocking fire from spreading to another space, a shutter open-closing system including the same, and a shutter open-closing method.

2. Description of the Related Art

In general, apartment housing, such as apartments and villas, and buildings, such as laboratories and distribution centers, have a plurality of floors instead of one floor, or a plurality of sections partitioned from each other. The plurality of floors and the plurality of sections are connected to each other through corridors, stairs, and elevators, and thus, if fire breaks out in one space, the fire may spread to other spaces, thereby increasing damages.

A shutter open-closing system is used to block fire from spreading to other spaces when the fire breaks out. The shutter open-closing system may be provided to an elevator of a building, stairs of a building, a research space of a laboratory, a work space of a distribution center, and the like. The shutter open-closing system may have a structure of preventing spread of fire by opening or closing a main door. The shutter open-closing system may include a shutter open-closing apparatus having a shutter configured to open or close an access space together with the main door.

SUMMARY

A shutter open-closing apparatus includes a separate shutter driving unit, which is not driven by a main driving unit configured to drive a main door but uses a power source for driving a shutter. Furthermore, the shutter includes a first shutter member driven by a first shutter driving unit and a second shutter member driven by a second shutter driving unit.

As such, a shutter open-closing system employs a scheme in which the main driving unit, the first shutter driving unit, and the second shutter driving unit individually operate, and thus, an operating mechanism has a complicated structure. Therefore, manufacturing, assembly and maintenance of the shutter open-closing system may be difficult, and an operating cost of the shutter open-closing system may increase.

Provided are a shutter open-closing apparatus capable of reducing an operating cost with easy manufacturing, assembly, and maintenance by simplifying an operating mechanism, a shutter open-closing system including the same, and a shutter open-closing method.

Problems to be solved by embodiments are not limited to the problems mentioned above, and the other problems not mentioned could be clearly understood by those of ordinary skill in the art to which the embodiments belong from the specification and the accompanying drawings.

Additional aspects will be set forth in part in the description which follows and, in part, will be apparent from the description, or may be learned by practice of the presented embodiments of the disclosure.

According to an aspect of the disclosure, a shutter open-closing apparatus includes a main body connected to a main door, which is opened and closed, to move along with movement of the main door, a main guide unit coupled to the main body, a shutter pushing unit movable on the main guide unit, a link unit rotatably connected to the shutter pushing unit to move along with movement of the shutter pushing unit, and a shutter connected to the link unit to move along with movement of the link unit, and opened and closed using a driving force for moving the main door.

According to another aspect of the disclosure, a shutter open-closing system includes a main frame having an access space formed therein, a first main door on the main frame to be movable in a first axial direction, a second main door on the main frame to be movable in the first axial direction, a first shutter open-closing apparatus including a first main body coupled to the first main door to move together with the first main door, a first shutter pushing unit on the first main body to be movable in the first axial direction, a first shutter connected to a first link unit to move in response to an operation of the first link unit connected to the first shutter pushing unit, and a first elastic unit providing a restoring force by an elastic force to the first shutter pushing unit, and a second shutter open-closing apparatus including a second main body coupled to the second main door to move together with the second main door, a second shutter pushing unit on the second main body to be movable in the first axial direction, a second shutter connected to a second link unit to move in response to an operation of the second link unit connected to the second shutter pushing unit, and a second elastic unit providing a restoring force by an elastic force to the second shutter pushing unit.

According to another aspect of the disclosure, a shutter open-closing method includes moving a first main door, which is opened and closed, and a first main body coupled to the first main door, in a first direction that is parallel to a first axial direction, moving a second main door, which is opened and closed, and a second main body coupled to the second main door, in a second direction that is opposite to the first direction, making a first shutter pushing unit on the first main body be in contact with a second shutter pushing unit on the second main body, moving the first shutter pushing unit in the second direction and moving the second shutter pushing unit in the first direction, and moving a first shutter connected to the first shutter pushing unit, in a second axial direction crossing the first axial direction, and moving a second shutter connected to the second shutter pushing unit, in the second axial direction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
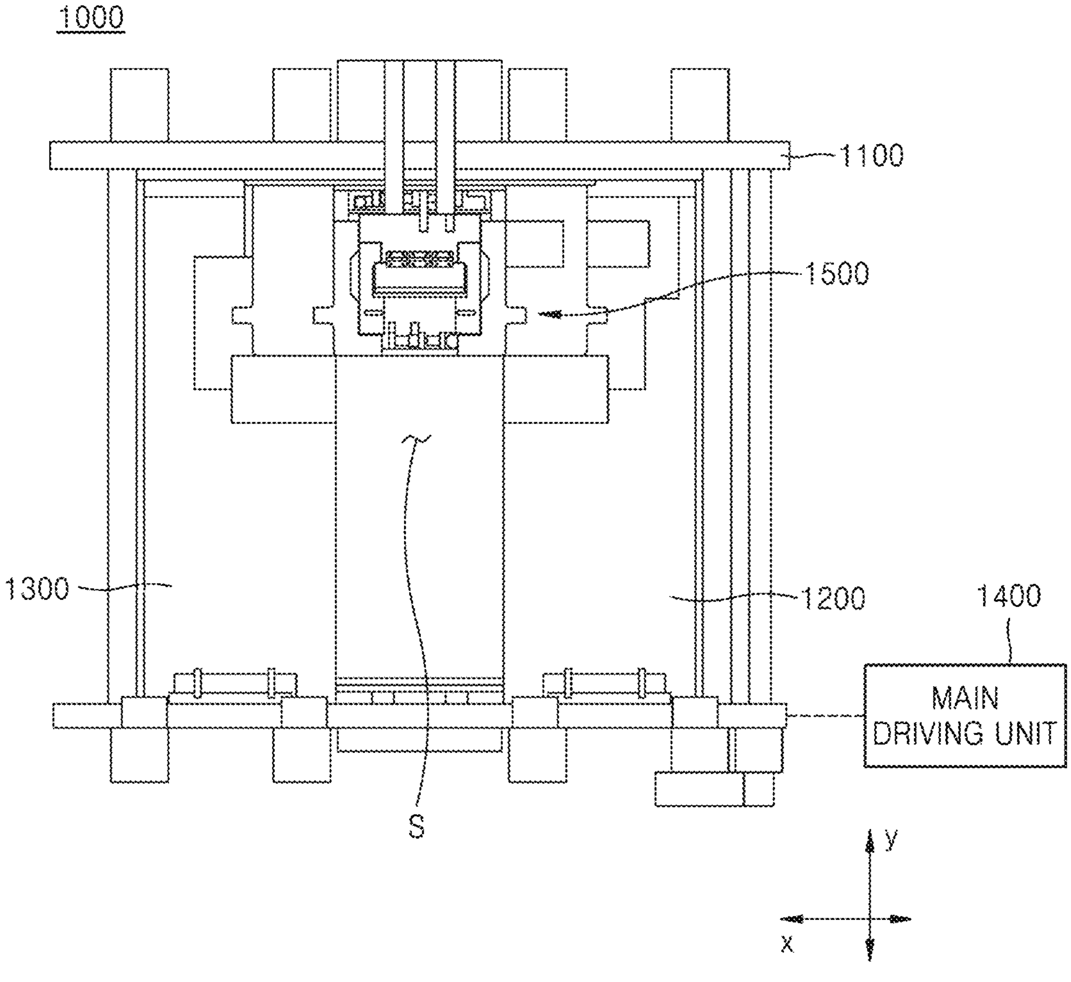
FIG. 1A is a front view of a shutter open-closing system according to related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

The terms used in embodiments are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the disclosure should be understood not as simple names but based on the meaning of the terms and the overall description.

Throughout the specification, it will also be understood that when a component "includes" an element, unless there is another opposite description thereto, it should be understood that the component does not exclude another element but may further include another element. In addition, terms such as "... unit", "... module", and the like refer to units that perform at least one function or operation, and the units may be implemented as hardware or software or as a combination of hardware and software.

In the description below, when it is described that a certain component is connected to another component, the certain component may be directly connected to another component, or a third component may be interposed therebetween. Similarly, when it is described that a certain component is above another component, the certain component may be directly above another component, or a third component may be interposed therebetween. In addition, in the drawings, the structures or sizes of components are exaggerated for convenience and clarity of description, and parts irrelevant to the description are omitted.

Figure 1B:
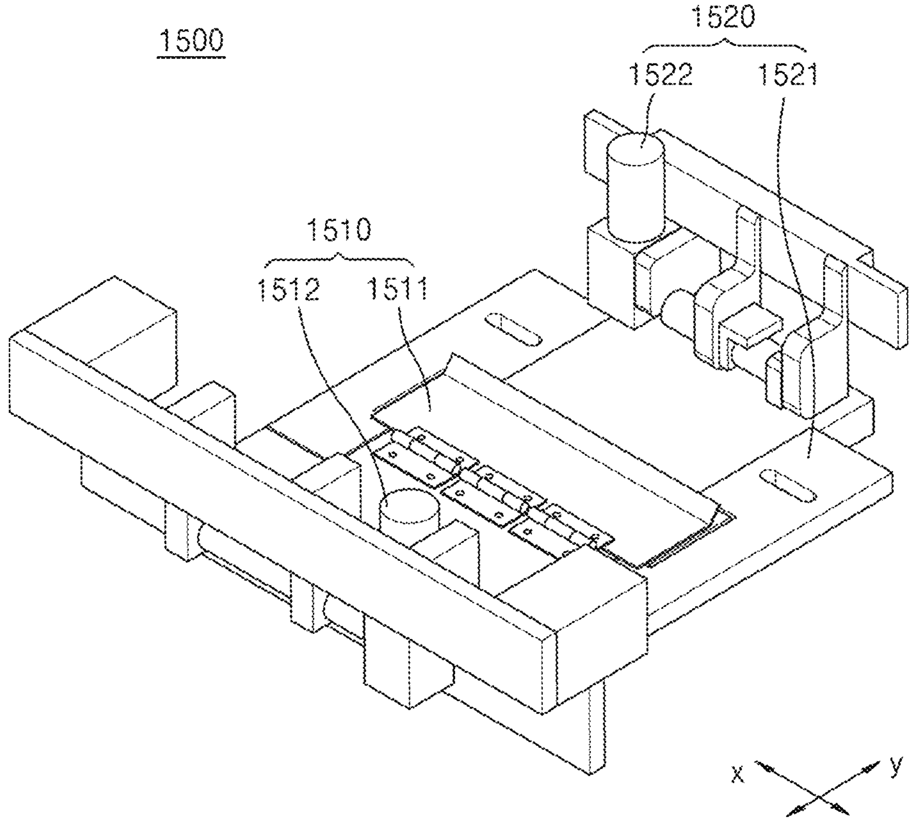
FIG. 1B is a perspective view of a shutter open-closing apparatus according to related art.
Figure 1C:
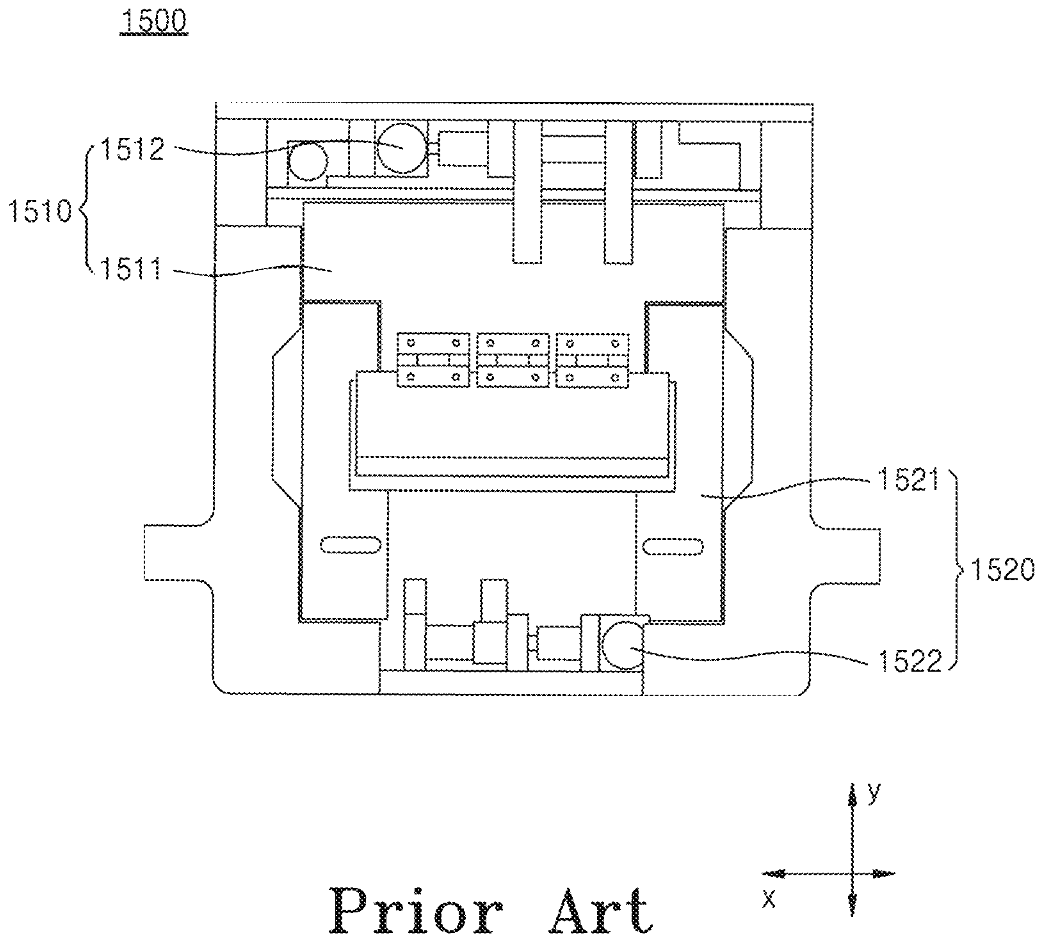
FIG. 1C is a front view of the shutter open-closing apparatus according to related art.

FIG. 1A is a front view of a shutter open-closing system 1000 according to related art, FIG. 1B is a perspective view of a shutter open-closing apparatus 1500 according to related art, and FIG. 1C is a front view of the shutter open-closing apparatus 1500 according to related art.

Referring to FIG. 1A, the shutter open-closing system 1000 according to related art may include a main frame 1100, a first main door 1200, a second main door 1300, a main driving unit 1400, and the shutter open-closing apparatus 1500.

The main frame 1100 may generally support the first main door 1200, the second main door 1300, the main driving unit 1400, and the shutter open-closing apparatus 1500. The main frame 1100 may be provided to an elevator of a building, stairs of a building, a research space of a laboratory, a work space of a distribution center, and the like.

The first main door 1200 and the second main door 1300 may be movable on the main frame 1100. The first main door 1200 and the second main door 1300 may open or close an access space S inside the main frame 1100 while moving in opposite directions along a first axial direction (an X-axis direction).

The main driving unit 1400 may control movement of the first main door 1200 and the second main door 1300.

The shutter open-closing apparatus 1500 may be provided to the main frame 1100 to open or close the access space S inside the main frame 1100 together with the first main door 1200 and the second main door 1300.

Referring to FIGS. 1B and 1C, the shutter open-closing apparatus 1500 according to related art may include a first driving module 1510 and a second driving module 1520, which individually operate.

The first driving module 1510 may include a first shutter 1511 configured to open and close the access space S inside the main frame 1100, and a first shutter driving unit 1512 configured to control movement of the first shutter 1511. The first shutter driving unit 1512 may rotate the first shutter 1511 to open and close the access space S.

The second driving module 1520 may include a second shutter 1521 configured to open and close the access space S inside the main frame 1100, and a second shutter driving unit 1522 configured to control movement of the second shutter 1521. The second shutter driving unit 1522 may rotate the second shutter 1521 to open and close the access space S.

Figure 2:
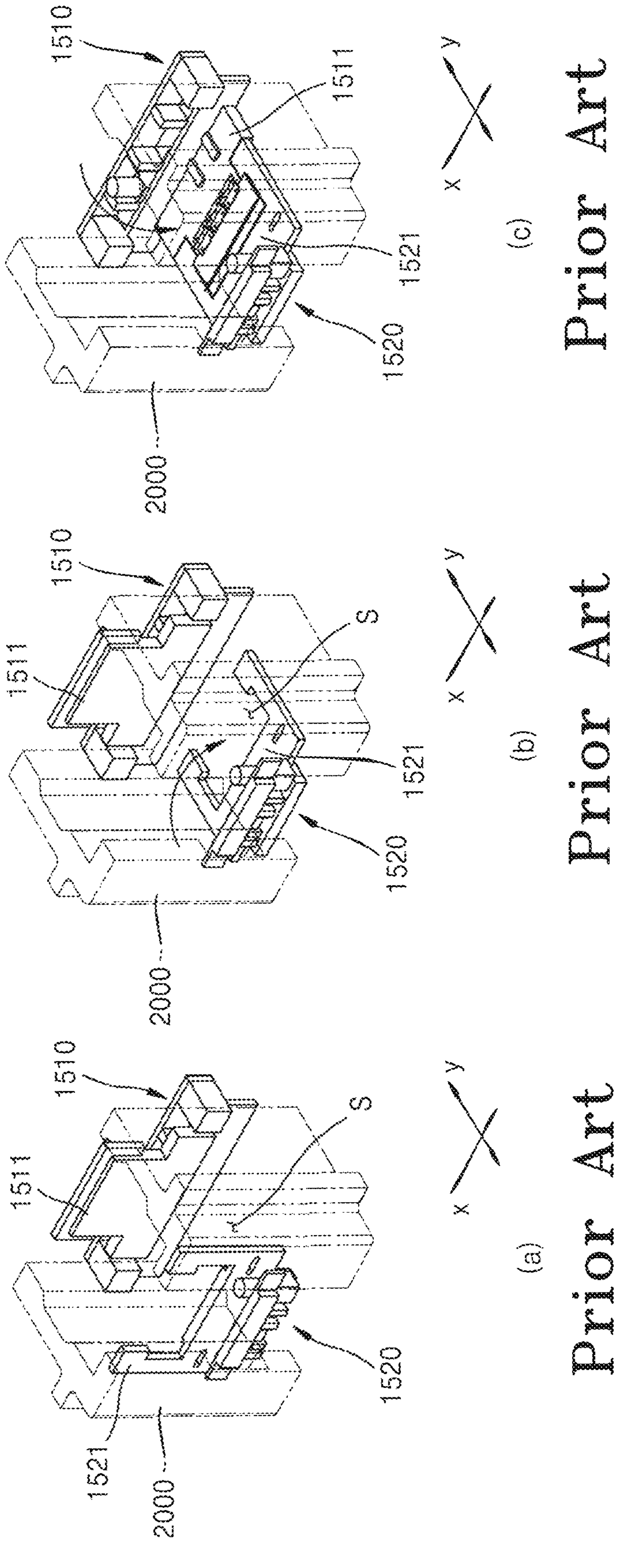
FIGS. 2A to 2C are perspective views for describing an operating process of the shutter open-closing apparatus according to related art.

FIGS. 2A to 2C are perspective views for describing an operating process of the shutter open-closing apparatus 1500 according to related art.

First, as shown in FIG. 2A, in a state in which the shutter open-closing apparatus 1500 according to related art is provided on a rail 2000, the access space S is opened.

Next, referring to FIG. 2B, the second shutter 1521 is driven by the second shutter driving unit. The second shutter 1521 may rotate to close at least a part of the access space S inside the rail 2000.

Next, referring to FIG. 2C, the first shutter 1511 is driven by the first shutter driving unit. The first shutter 1511 may rotate to close at least a part of the access space S inside the rail 2000.

Herein, according to related art, the first shutter 1511 and the second shutter 1521 are driven not by the main driving unit 1400 configured to drive the first and second main doors 1200 and 1300 but by the first and second shutter driving units 1512 and 1522, respectively. Furthermore, the first shutter 1511 and the second shutter 1521 are driven not by one driving unit but respectively by the first shutter driving unit 1512 and the second shutter driving unit 1522.

As described above, the shutter open-closing system 1000 according to related art employs a scheme by which the main driving unit 1400, the first shutter driving unit 1512, and the second shutter driving unit 1522 individually operate and thus has an operating mechanism of a complicated structure. To manufacture the shutter open-closing system 1000, an assembly work for each of the main driving unit 1400, the first shutter driving unit 1512, and the second shutter driving unit 1522, which individually operate, is necessarily required. Therefore, according to related art, manufacturing, assembly, and maintenance of the shutter open-closing system 1000 may be difficult, and an operating cost of the shutter open-closing system 1000 may increase.

Embodiments below relate to a shutter open-closing apparatus, a shutter open-closing system, and a shutter open-closing method capable of improving producibility, assemblability, and maintainability and reducing an operating cost. Hereinafter, embodiments will be described in detail with reference to the accompanying drawings so that those of ordinary skill in the art may easily realize the disclosure. However, the embodiments may be embodied in many different forms and should not be construed as being limited to the embodiments set forth herein.

A shutter open-closing system 1 according to an embodiment is provided to an elevator of a building, stairs of a building, a research space of a laboratory, a work space of a distribution center, and the like to prevent fire from spreading to other spaces when the fire breaks out. The shutter open-closing system 1 includes a shutter open-closing apparatus 100, and thus, the shutter open-closing system 1 according to an embodiment is described before the shutter open-closing apparatus 100 according to an embodiment is described.

Figure 3:
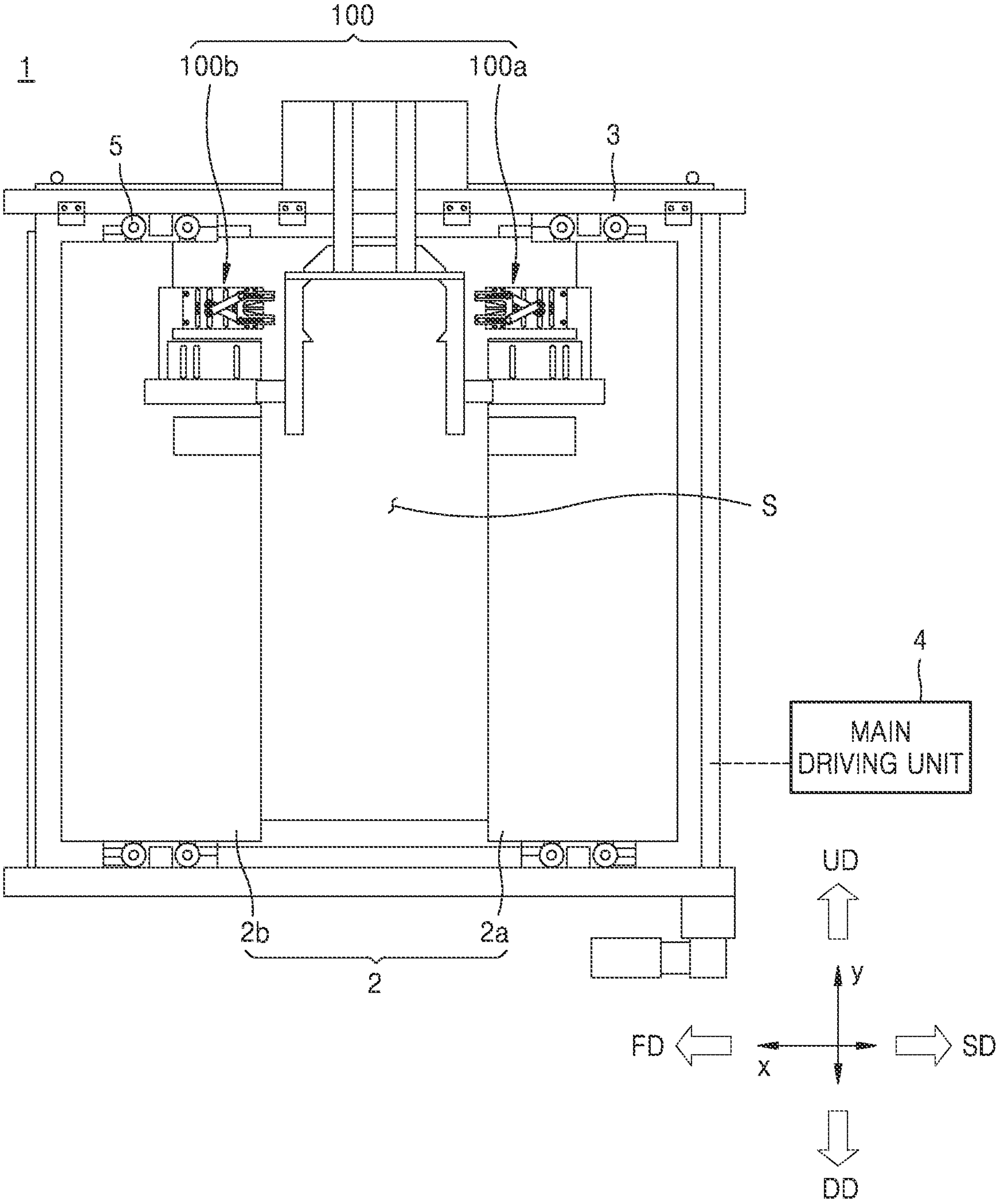
FIG. 3 is a front view of a shutter open-closing system according to an embodiment.

FIG. 3 is a front view of the shutter open-closing system 1 according to an embodiment.

Referring to FIG. 3, the shutter open-closing system 1 according to an embodiment may include a main door 2, a main frame 3, a main driving unit 4, and a rail rotation unit 5. However, components of the shutter open-closing system 1 according to an embodiment are not limited thereto, and components according to an embodiment may be added, or at least one component may be omitted.

The main door 2 is movable on the main frame 3. The main door 2 may include a first main door 2*a* and a second main door 2*b* moving in the first axial direction (the X-axis direction). The first main door 2*a* and the second main door 2*b* may open or close the access space S of the main frame 3 while moving in a first direction (the FD arrow direction) and a second direction (the SD arrow direction). The first main door 2*a* and the second main door 2*b* may open the access space S by moving in directions away from each other. The first main door 2*a* and the second main door 2*b* may close the access space S by moving in directions toward each other. The first direction (the FD arrow direction) and the second direction (the SD arrow direction) are opposite to each other and may be parallel to the first axial direction (the X-axis direction).

However, the first direction (the FD arrow direction), the second direction (the SD arrow direction), a third direction (a UD arrow direction), and a fourth direction (a DD arrow direction) used in the specification do not indicate particular directions but are used to distinguish moving directions of components of the shutter open-closing system 1 according to an embodiment.

The shutter open-closing apparatus 100 according to an embodiment may be coupled to the main door 2. Accordingly, the shutter open-closing system 1 according to an embodiment may be implemented by a structure in which the shutter open-closing apparatus 100 moves along with movement of the main door 2.

The main frame 3 may generally support the main door 2, the main driving unit 4, and the rail rotation unit 5. The access space S inside the main frame 3 may be opened or closed by the main door 2 and the shutter open-closing apparatus 100.

The main driving unit 4 may control movement of the main door 2. The main driving unit 4 may include a power source. For example, the main driving unit 4 may move the main door 2 by a scheme using an electric motor or a cylinder scheme using a hydraulic or pneumatic cylinder. As another example, the main driving unit 4 may move the main door 2 by a gear scheme using a rack gear and a pinion gear or a ball screw scheme using a ball screw and a ball nut. The main driving unit 4 may be connected to the main door 2.

The rail rotation unit 5 may be provided to the main frame 3 to rotate along with movement of the main door 2. When the main door 2 moves in the first axial direction (the X-axis direction), the rail rotation unit 5 may rotate in contact with the main door 2. A plurality of rail rotation units 5 may be provided to the main frame 3 to be separated from each other. For example, the plurality of rail rotation units 5 may be provided to each of a lower side and an upper side of the main frame 3.

Hereinafter, the shutter open-closing apparatus 100 according to an embodiment is described.

Referring to FIG. 3, the shutter open-closing apparatus 100 according to an embodiment may be coupled to the main door 2 and move together with the main door 2 in the first direction (the FD arrow direction) or the second direction (the SD arrow direction). That is, the shutter open-closing apparatus 100 according to an embodiment may move by using a driving force for the main driving unit 4 to move the main door 2. While the shutter open-closing apparatus 100 according to an embodiment moves in the first axial direction (the X-axis direction), at least a part of the access space S may be opened or closed. The shutter open-closing apparatus 100 according to an embodiment may close a smaller area than an area of the access space S closed by the main door 2.

The shutter open-closing apparatus 100 according to an embodiment may include a first shutter open-closing apparatus 100*a* and a second shutter open-closing apparatus 100*b*.

The first shutter open-closing apparatus 100*a* may be coupled to the first main door 2*a*. Accordingly, the first shutter open-closing apparatus 100*a* may move together with the first main door 2*a*.

The second shutter open-closing apparatus 100*b* may be coupled to the second main door 2*b*. Accordingly, the second shutter open-closing apparatus 100*b* may move together with the second main door 2*b*.

The second shutter open-closing apparatus 100*b* and the first shutter open-closing apparatus 100*a* may be implemented by the same structure except for their provided positions.

Figure 4:
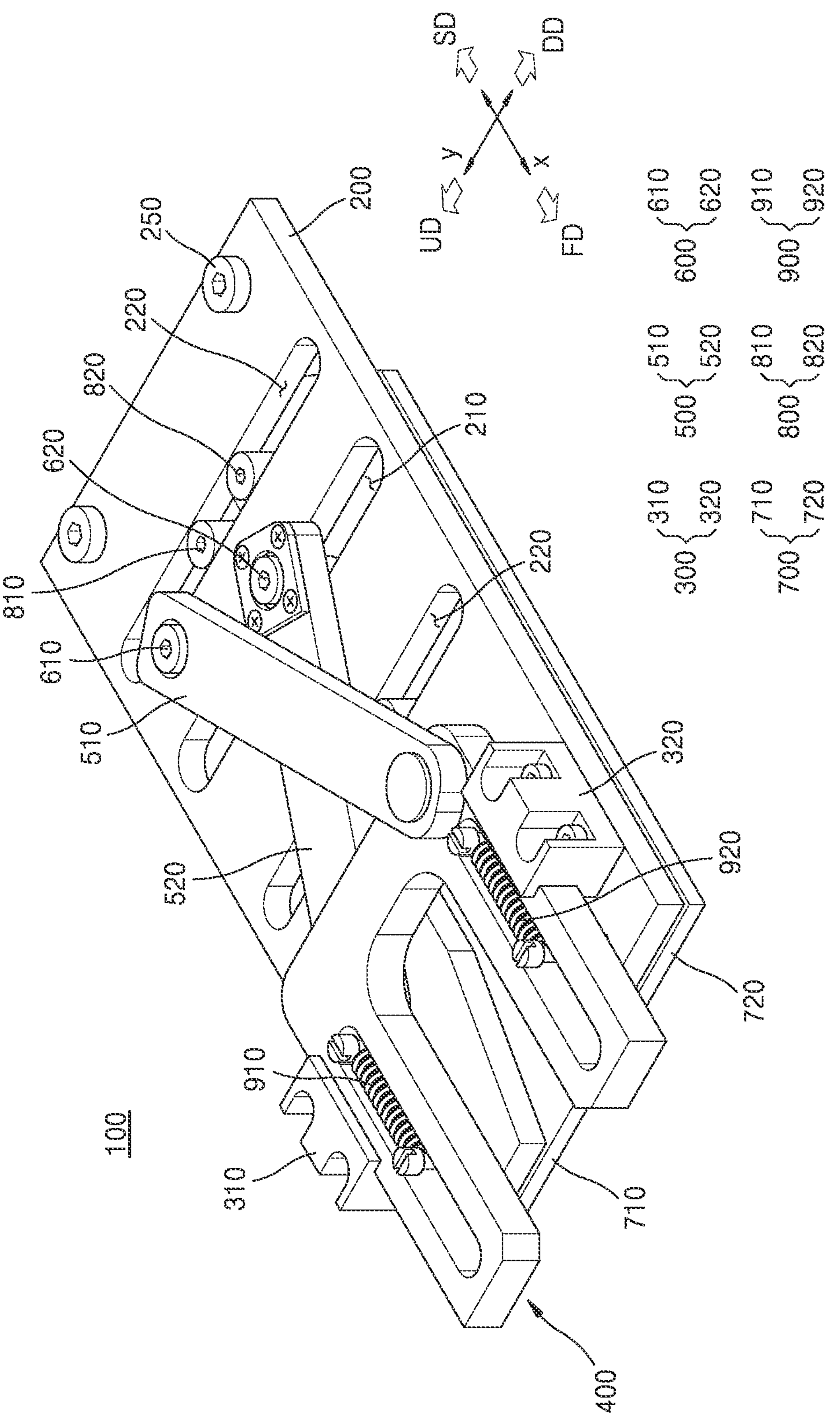
FIG. 4 is a perspective view of a shutter open-closing apparatus according to an embodiment.

FIG. 4 is a perspective view of the shutter open-closing apparatus 100 according to an embodiment.

The shutter open-closing apparatus 100 according to an embodiment may include a main body 200, a main guide unit 300, a shutter pushing unit 400, a link unit 500, a link connection unit 600, a shutter 700, a shutter guide unit 800, and an elastic unit 900. However, components of the shutter open-closing apparatus 100 according to an embodiment are not limited thereto, and components according to an embodiment may be added, or at least one component may be omitted.

The main body 200 may be connected to the main door 2 and move along movement of the main door 2. The main body 200 may function as a main body of the shutter open-closing apparatus 100 according to an embodiment. The main body 200 may be formed generally in a shape of a rectangular parallelepiped but is not limited thereto, and the main body 200 may be formed in any shape only if the main body 200 functions as a main body of the shutter open-closing apparatus 100 according to an embodiment.

The shutter open-closing apparatus 100 according to an embodiment may include a fixing member 250. The fixing member 250 may be coupled to each of the main body 200 and the main door 2 to fix the main body 200 to the main door 2. The fixing member 250 may be a screw, and a plurality of fixing members 250 may be coupled to the main body 200 and the main door 2.

The main body 200 may have a link moving hole 210 and a shutter guide hole 220 formed therein.

The link connection unit 600 to be described below may be inserted into the link moving hole 210. The link connection unit 600 may move in a state of being inserted into the link moving hole 210. The link moving hole 210 may be formed by penetrating one surface and the other surface of the main body 200.

A shutter guide unit 800 to be described below may be inserted into the shutter guide hole 220. The shutter guide unit 800 may move in a state of being inserted into the shutter guide hole 220. The shutter guide hole 220 may be formed by penetrating one surface and the other surface of the main body 200. A plurality of shutter guide holes 220 may be formed at positions separated from the link moving hole 210.

Referring to FIG. 4, the main guide unit 300 may be coupled to the main body 200. The main guide unit 300 may guide the shutter pushing unit 400 to move in the first axial direction (the X-axis direction). The main guide unit 300 may be on a side surface of the shutter pushing unit 400. For example, the main guide unit 300 may be detachably coupled to the main body 200, and as another example, the main guide unit 300 may be integrally formed with the main body 200.

The main guide unit 300 may include a first guide supporter 310 and a second guide supporter 320 separated from each other.

The first guide supporter 310 may be at one side of the shutter pushing unit 400 to support the one side of the shutter pushing unit 400. Accordingly, the first guide supporter 310 may guide the one side of the shutter pushing unit 400.

The second guide supporter 320 may be at the other side of the shutter pushing unit 400 to support the other side of the shutter pushing unit 400. Accordingly, the second guide supporter 320 may guide the other side of the shutter pushing unit 400.

The second guide supporter 320 and the first guide supporter 310 may support both side surfaces of the shutter pushing unit 400. Accordingly, the shutter pushing unit 400 may move in the first axial direction (the X-axis direction) without escaping in a state in which both side surfaces of the shutter pushing unit 400 are supported by the first guide supporter 310 and the second guide supporter 320, and thus, the shutter open-closing apparatus 100 according to an embodiment may be implemented by a structure in which movement of the shutter pushing unit 400 is easy.

Referring to FIG. 4, the shutter pushing unit 400 may be movable on the main guide unit 300. The shutter pushing unit 400 may move in the first direction (the FD arrow direction) or the second direction (the SD arrow direction). The link unit 500 may be connected to the shutter pushing unit 400.

The shutter pushing unit 400 may move in the first axial direction (the X-axis direction) in a state of being separated from the main body 200. Accordingly, because the shutter pushing unit 400 may move in which the shutter pushing unit 400 is not in contact with the main body 200, the possibility that wear occurs due to contact between the shutter pushing unit 400 and the main body 200 may be reduced. Therefore, a use cycle of the shutter pushing unit 400 and the main body 200 may be improved.

Referring to FIG. 4, the link unit 500 may be rotatably connected to the shutter pushing unit 400 to move along with movement of the shutter pushing unit 400. When the shutter pushing unit 400 moves in the first axial direction (the X-axis direction), the link unit 500 may move together with the shutter pushing unit 400. One end of the link unit 500 may be rotatably connected to the link connection unit 600, and the other end of the link unit 500 may be rotatably connected to the shutter pushing unit 400.

The link unit 500 may include a first link member 510 and a second link member 520.

The first link member 510 may be rotatably connected to the shutter pushing unit 400. The first link member 510 may move along with movement of the shutter pushing unit 400. One end of the first link member 510 may be rotatably connected to a first link connection member 610, and the other end of the first link member 510 may be rotatably connected to the shutter pushing unit 400.

The second link member 520 may be rotatably connected to the shutter pushing unit 400 at a position separated from the first link member 510. The second link member 520 may move along with movement of the shutter pushing unit 400. One end of the second link member 520 may be rotatably connected to a second link connection member 620, and the other end of the second link member 520 may be rotatably connected to the shutter pushing unit 400.

The second link member 520 and the first link member 510 may intersect with each other. The other end of the second link member 520 may be on one surface of the shutter pushing unit 400, and the other end of the first link member 510 may be on the other surface of the shutter pushing unit 400. In this case, when the shutter pushing unit 400 moves in the first axial direction (the X-axis direction), a separation distance between the one end of the first link member 510 and the one end of the second link member 520 may change.

Referring to FIG. 4, the link connection unit 600 may be connected to each of the link unit 500 and the shutter 700.

The link connection unit 600 may move along with movement of the link unit 500 to thereby move the shutter 700.

The link connection unit 600 may move in a second axial direction (a Y-axis direction). The second axial direction (the Y-axis direction) may be a direction crossing the first axial direction (the X-axis direction). For example, the second axial direction (the Y-axis direction) may be a direction perpendicular to the first axial direction (the X-axis direction).

The link connection unit 600 may move in the third direction (the UD arrow direction) or the fourth direction (the DD arrow direction) when the shutter pushing unit 400 connected to the link unit 500 moves in the first axial direction (the X-axis direction). In this case, the third direction (the UD arrow direction) and the fourth direction (the DD arrow direction) may be parallel to the second axial direction (the Y-axis direction) and opposite to each other.

The link connection unit 600 may move in a state of being inserted into the link moving hole 210. Accordingly, the shutter open-closing apparatus 100 according to an embodiment may have a structure in which the link unit 500 and the shutter 700 are easily guided to move. In an embodiment, the link connection unit 600 may rotate and move when the shutter pushing unit 400 moves.

The link connection unit 600 may include the first link connection member 610 and the second link connection member 620.

The first link connection member 610 may be connected to each of the first link member 510 and a first shutter member 710. When the shutter pushing unit 400 moves in the first axial direction (the X-axis direction), the first link connection member 610 may move in the second axial direction (the Y-axis direction) in a state of being inserted into the link moving hole 210. The first link connection member 610 may be rotatably connected to each of the first link member 510 and the first shutter member 710.

The second link connection member 620 may be connected to each of the second link member 520 and a second shutter member 720. When the shutter pushing unit 400 moves in the first axial direction (the X-axis direction), the second link connection member 620 may move in the second axial direction (the Y-axis direction) in a state of being inserted into the link moving hole 210. The second link connection member 620 may be rotatably connected to each of the second link member 520 and the second shutter member 720.

The second link connection member 620 and the first link connection member 610 may move in opposite directions to each other along with movement of the shutter pushing unit 400. That is, when the shutter pushing unit 400 moves in the first axial direction (the X-axis direction), a separation distance between the second link connection member 620 and the first link connection member 610 may change.

Referring to FIG. 4, the shutter 700 may be connected to the link unit 500 to move along with movement of the link unit 500. The shutter 700 may be connected to the link unit 500 through the link connection unit 600.

The shutter 700 may move in the second axial direction (the Y-axis direction) when the shutter pushing unit 400 moves in the first axial direction (the X-axis direction). Accordingly, the shutter 700 may open or close at least a part of the access space S. When the shutter pushing unit 400 moves in the first axial direction (the X-axis direction), the one end of the first link member 510 and the one end of the second link member 520 may move in the second axial direction (the Y-axis direction), and the first link connection member 610 and the second link connection member 620 may also move in the second axial direction (the Y-axis direction). Accordingly, the shutter 700 connected to the link connection unit 600 may also move in the second axial direction (the Y-axis direction).

The shutter open-closing apparatus 100 according to an embodiment may open or close the shutter 700 by using a driving force for moving the main door 2 without including a separate shutter driving unit using a power source to move the shutter 700. That is, the shutter open-closing apparatus 100 according to an embodiment may have a structure of moving the shutter pushing unit 400 and opening or closing the shutter 700 by opening or closing the main door 2.

Therefore, because the shutter open-closing apparatus 100 according to an embodiment may open or close the shutter 700 by an operation of the main driving unit 4 configured to drive the main door 2, when compared to related art, the case of an operation for opening and closing the access space S may be improved. In addition, because the shutter open-closing apparatus 100 according to an embodiment has a simple operating mechanism, manufacturing, assembly, and maintenance may be easy, and an operating cost may be reduced.

The shutter 700 may include the first shutter member 710 and the second shutter member 720.

The first shutter member 710 may be connected to the first link connection member 610. The first shutter member 710 may move in the third direction (the UD arrow direction) and the fourth direction (the DD arrow direction) together with the first link connection member 610.

The second shutter member 720 may be connected to the second link connection member 620. The second shutter member 720 may move in the third direction (the UD arrow direction) and the fourth direction (the DD arrow direction) together with the second link connection member 620.

The second shutter member 720 and the first shutter member 710 may move in opposite directions to each other along with movement of the shutter pushing unit 400. That is, when the shutter pushing unit 400 moves, a separation distance between the second shutter member 720 and the first shutter member 710 may change. Accordingly, the second shutter member 720 and the first shutter member 710 may open or close at least a part of the access space S.

Referring to FIG. 4, the shutter guide unit 800 may be connected to the shutter 700. The shutter guide unit 800 may move along with movement of the shutter 700. The shutter guide unit 800 may move in the second axial direction (the Y-axis direction) together with the shutter 700 in a state of being inserted into the shutter guide hole 220. Accordingly, movement of the shutter 700 may be safely guided.

The shutter guide unit 800 may include a first shutter guide member 810 and a second shutter guide member 820.

The first shutter guide member 810 may be connected to the first shutter member 710. The first shutter guide member 810 may move along with movement of the first shutter member 710 in the second axial direction (the Y-axis direction) in a state of being inserted into the shutter guide hole 220. In an embodiment, the first shutter guide member 810 may be rotatably connected to the first shutter member 710.

A plurality of first shutter guide members 810 may be connected to the first shutter member 710. In this case, the plurality of shutter guide holes 220 may be formed in the main body 200. The plurality of first shutter guide members 810 may be arranged with the first link connection member 610 therebetween. Although FIG. 4 shows that two first shutter guide members 810 are coupled to the first shutter member 710, this is illustrative.

The second shutter guide member 820 may be connected to the second shutter member 720. The second shutter guide member 820 may move along with movement of the second shutter member 720 in the second axial direction (the Y-axis direction) in a state of being inserted into the shutter guide hole 220. In an embodiment, the second shutter guide member 820 may be rotatably connected to the second shutter member 720.

A plurality of second shutter guide members 820 may be connected to the second shutter member 720. In this case, the plurality of shutter guide holes 220 may be formed in the main body 200. The plurality of second shutter guide members 820 may be arranged with the second link connection member 620 therebetween. Although FIG. 4 shows that two second shutter guide members 820 are coupled to the second shutter member 720, this is illustrative.

Referring to FIG. 4, the elastic unit 900 may return the shutter pushing unit 400 to an initial position of the shutter pushing unit 400 by using a restoring force by an elastic force. The initial position of the shutter pushing unit 400 may be a position of the shutter pushing unit 400 in a state in which the restoring force of the elastic unit 900 is not applied to the shutter pushing unit 400. For example, when the shutter pushing unit 400 moves in the second direction (the SD arrow direction), the restoring force by the elastic force of the elastic unit 900 may be applied in the first direction (the FD arrow direction). In this case, unless a separate external force is applied to the shutter pushing unit 400, the shutter pushing unit 400 may move in the first direction (the FD arrow direction) to return to the initial position of the shutter pushing unit 400.

The elastic unit 900 may be provided to the shutter pushing unit 400. One side of the elastic unit 900 may be coupled to the shutter pushing unit 400, and the other side of the elastic unit 900 may be coupled to the main body 200. Accordingly, when the shutter pushing unit 400 moves in the second direction (the SD arrow direction), the elastic unit 900 may be implemented by a structure of providing a restoring force by an elastic force to the shutter pushing unit 400.

The elastic unit 900 may include a first elastic body 910 and a second elastic body 920.

The first elastic body 910 and the second elastic body 920 may be provided to the shutter pushing unit 400 at positions separated from each other. The first clastic body 910 and the second elastic body 920 may have a length-changing structure and provide a restoring force by an elastic force to the shutter pushing unit 400 in response to a change in a length thereof. One side of each of the first elastic body 910 and the second elastic body 920 may be coupled to the shutter pushing unit 400, and the other side of each of the first elastic body 910 and the second elastic body 920 may be coupled to the main body 200.

Figure 5:
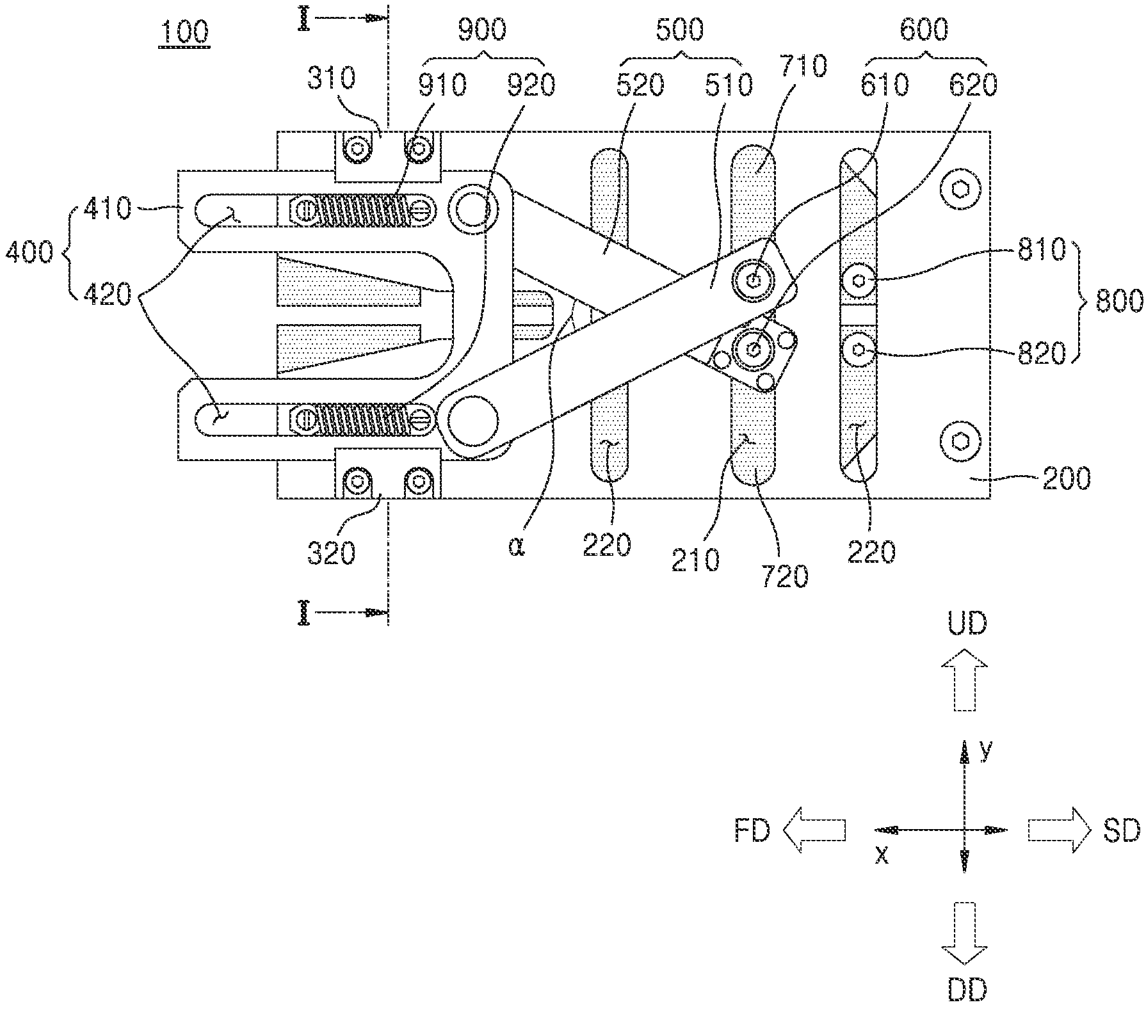
FIG. 5 is a front view of the shutter open-closing apparatus according to an embodiment.

FIG. 5 is a front view of the shutter open-closing apparatus 100 according to an embodiment.

Components of the shutter open-closing apparatus 100 according to an embodiment shown in FIG. 5 are the same as described with reference to FIG. 4, and thus, components not shown with reference numerals in FIG. 4 are described. In addition, because the shutter 700 is on a rear surface of the main body 200 in FIG. 5, hatching is applied to the shutter 700 to distinguish the shutter 700 from the other components.

Referring to FIG. 5, the shutter pushing unit 400 may include a pushing main body 410 and an elastic unit insertion portion 420.

The pushing main body 410 may function as a main body of the shutter pushing unit 400. The pushing main body 410 may move in the first axial direction (the X-axis direction) and may be between the first guide supporter 310 and the second guide supporter 320.

The elastic unit 900 may be inserted into the elastic unit insertion portion 420. The elastic unit insertion portion 420 may be formed in the pushing main body 410. The elastic unit insertion portion 420 may extend in the first axial direction (the X-axis direction). The elastic unit insertion portion 420 may be formed by penetrating one surface and the other surface of the pushing main body 410. When the elastic unit 900 includes the first clastic body 910 and the second elastic body 920, two elastic unit insertion portions 420 may be formed in the pushing main body 410.

Referring to FIG. 5, when the shutter pushing unit 400 moves in the first axial direction (the X-axis direction), a magnitude of an included angle α between the first link member 510 and the second link member 520 may vary. Accordingly, movement of the shutter 700 may be induced.

For example, when the shutter pushing unit 400 moves in the second direction (the SD arrow direction), the magnitude of the included angle α between the first link member 510 and the second link member 520 may increase. In this case, the separation distance between the one end of the first link member 510 and the one end of the second link member 520 and the separation distance between the first link connection member 610 and the second link connection member 620 may increase. Accordingly, the first shutter member 710 connected to the first link connection member 610 may move in the third direction (the UD arrow direction), and the second shutter member 720 connected to the second link connection member 620 may move in the fourth direction (the DD arrow direction). By a process described above, a part of the access space S may be closed by the shutter 700.

As another example, when the shutter pushing unit 400 moves in the first direction (the FD arrow direction), the magnitude of the included angle α between the first link member 510 and the second link member 520 may decrease. In this case, the separation distance between the one end of the first link member 510 and the one end of the second link member 520 and the separation distance between the first link connection member 610 and the second link connection member 620 may decrease. Accordingly, the first shutter member 710 connected to the first link connection member 610 may move in the fourth direction (the DD arrow direction), and the second shutter member 720 connected to the second link connection member 620 may move in the third direction (the UD arrow direction). By a process described above, a part of the access space S may be opened by the shutter 700.

The shutter open-closing apparatus 100 according to an embodiment may have a structure in which movement of the link unit 500, the link connection unit 600, and the shutter 700 is sequentially induced by only an operation of the shutter pushing unit 400. Therefore, according to the shutter open-closing apparatus 100 according to an embodiment, the case of a work for opening and closing the shutter 700 may be improved.

FIGS. 6A to 7B are front views for describing an operating process of a shutter open-closing apparatus according to an embodiment. Hereinafter, an operating process of a shutter open-closing apparatus is concretely described with reference to FIGS. 6A to 7B. In addition, because the shutter 700 is on the rear surface of the main body 200 in FIGS. 6A to 7B, hatching is applied to the shutter 700 to distinguish the shutter 700 from the other components.

First, a process in which the shutter 700 closes a part of the access space S is described with reference to FIGS. 6A and 6B.

Figure 6B:
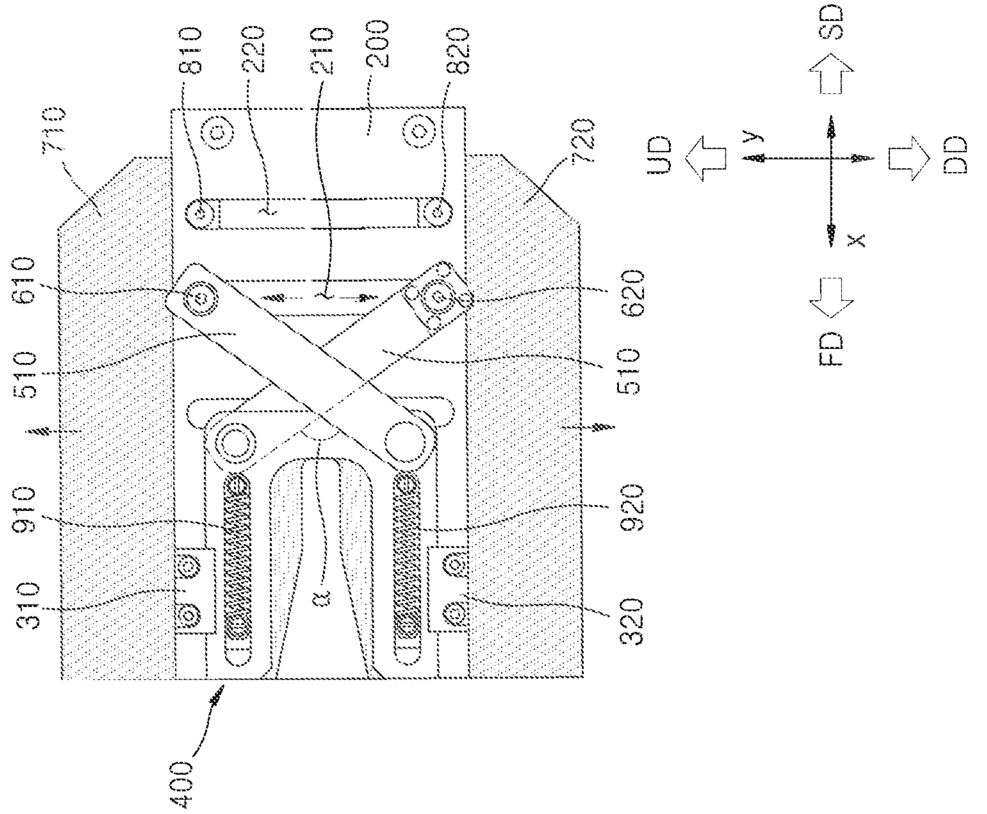
FIGS. 6A to 7B are front views for describing an operating process of a shutter open-closing apparatus according to an embodiment.
Figure 6A:
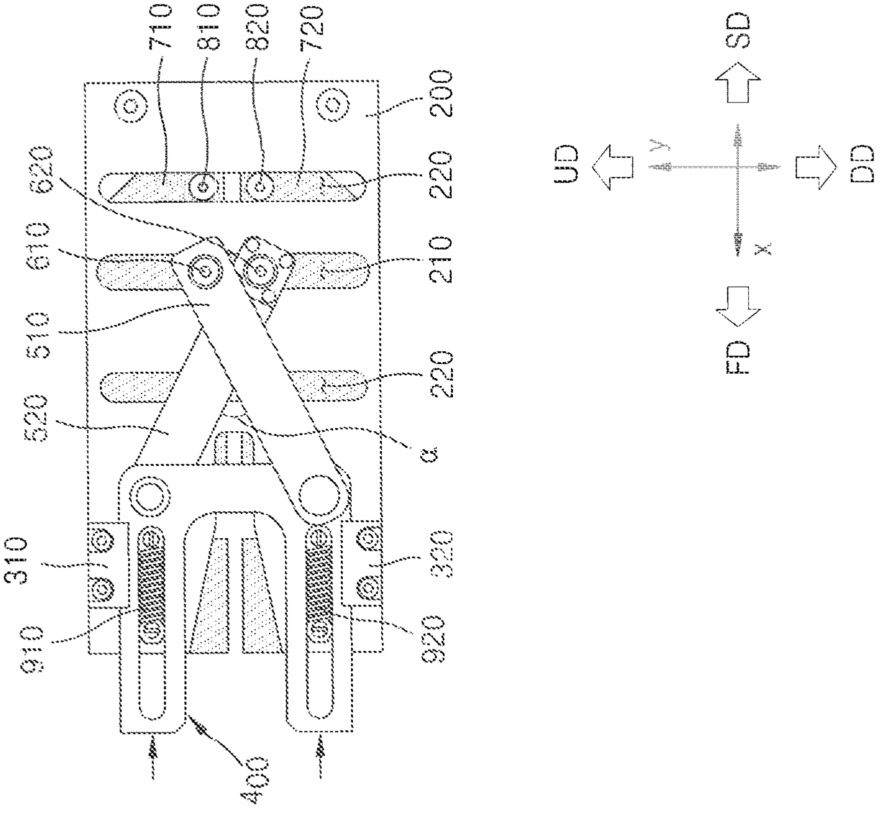

First of all, as shown in FIG. 6A, an external force is applied to the shutter pushing unit 400 in the second direction (the SD arrow direction). Accordingly, the shutter pushing unit 400 may move in the second direction (the SD arrow direction).

Next, as shown in FIG. 6B, when the shutter pushing unit 400 moves in the second direction (the SD arrow direction), the link unit 500 may operate. Particularly, the one end of the first link member 510 may rotate around the first link connection member 610, and the other end of the first link member 510 may rotate around the shutter pushing unit 400. In addition, the one end of the second link member 520 may rotate around the second link connection member 620, and the other end of the second link member 520 may rotate around the shutter pushing unit 400.

Accordingly, the magnitude of the included angle α between the first link member 510 and the second link member 520 may increase, the one end of the first link member 510 and the first link connection member 610 may move in the third direction (the UD arrow direction), and the one end of the second link member 520 and the second link connection member 620 may move in the fourth direction (the DD arrow direction).

Next, the first shutter member 710 connected to the first link connection member 610 may move in the third direction (the UD arrow direction), and the second shutter member 720 connected to the second link connection member 620 may move in the fourth direction (the DD arrow direction).

In this case, because the first link connection member 610 moves in the third direction (the UD arrow direction) in a state of being inserted into the link moving hole 210, the first shutter member 710 may be guided to move in the third direction (the UD arrow direction). Because the second link connection member 620 moves in the fourth direction (the DD arrow direction) in a state of being inserted into the link moving hole 210, the second shutter member 720 may be guided to move in the fourth direction (the DD arrow direction).

In addition, the first shutter guide member 810 may move along with movement of the first shutter member 710 in the third direction (the UD arrow direction) in a state of being inserted into the shutter guide hole 220. The second shutter guide member 820 may move along with movement of the second shutter member 720 in the fourth direction (the DD arrow direction) in a state of being inserted into the shutter guide hole 220. Accordingly, movement of the first shutter member 710 and the second shutter member 720 in the second axial direction (the Y-axis direction) may be guided by the first and second shutter guide members 810 and 820.

When the shutter pushing unit 400 moves in the second direction (the SD arrow direction), lengths of the first clastic body 910 and the second elastic body 920 may increase so that a restoring force by an elastic force is provided to the shutter pushing unit 400 in the first direction (the FD arrow direction).

By a process described above, at least a part of the access space S may be closed by the shutter 700.

Next, a process in which the shutter 700 opens a part of the access space S is described with reference to FIGS. 7A and 7B.

Figure 7B:
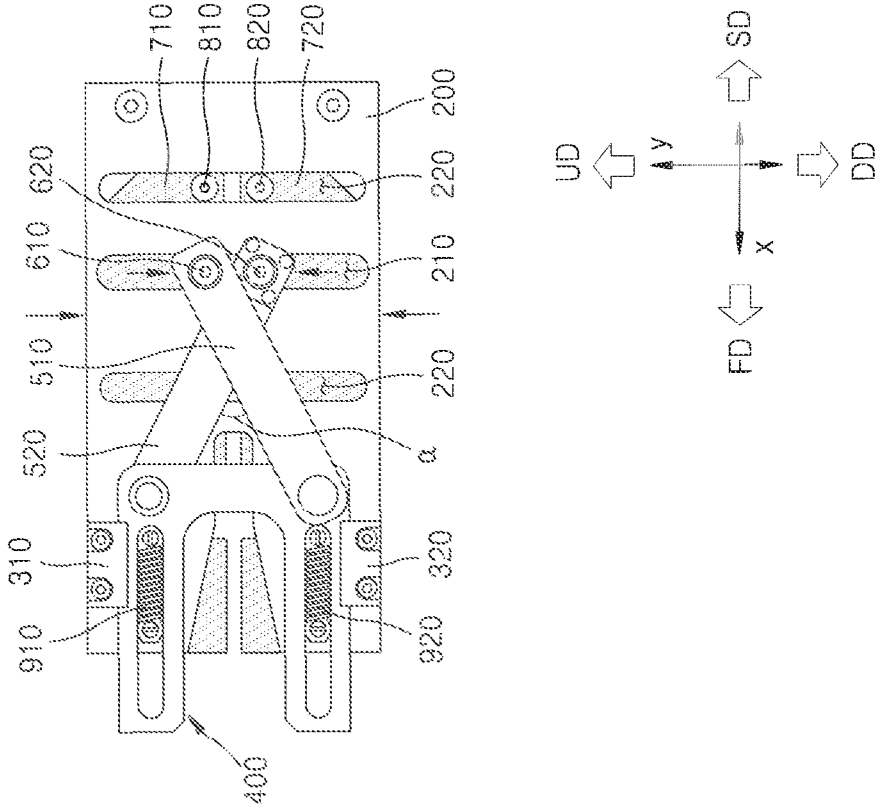
Figure 7A:
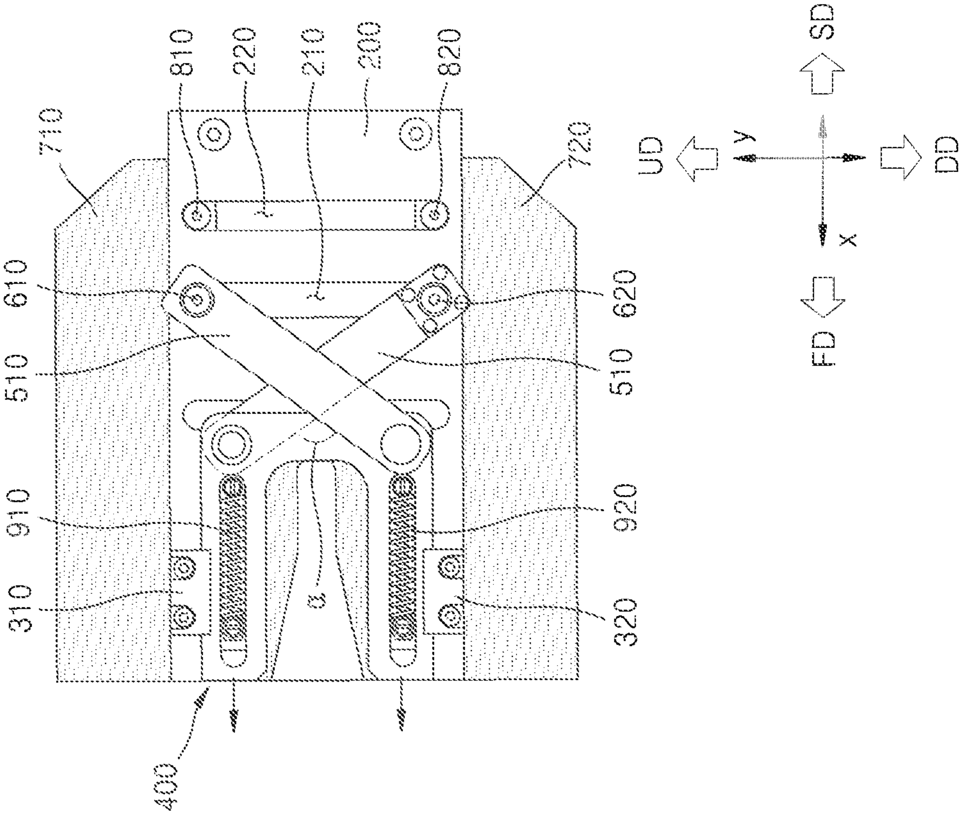

First, as shown in FIG. 7A, in a state in which the shutter pushing unit 400 has moved in the second direction (the SD arrow direction), the first clastic body 910 and the second elastic body 920 may provide a restoring force by an elastic force to the shutter pushing unit 400 in the first direction (the FD arrow direction). Herein, if there is no external force for limiting movement of the shutter pushing unit 400, the shutter pushing unit 400 may move in the first direction (the FD arrow direction).

Next, as shown in FIG. 7B, when the shutter pushing unit 400 moves in the first direction (the FD arrow direction), the link unit 500 may operate. Particularly, the one end of the first link member 510 may rotate around the first link connection member 610, and the other end of the first link member 510 may rotate around the shutter pushing unit 400. In addition, the one end of the second link member 520 may rotate around the second link connection member 620, and the other end of the second link member 520 may rotate around the shutter pushing unit 400.

Accordingly, the magnitude of the included angle α between the first link member 510 and the second link member 520 may decrease, the one end of the first link member 510 and the first link connection member 610 may move in the fourth direction (the DD arrow direction), and the one end of the second link member 520 and the second link connection member 620 may move in the third direction (the UD arrow direction).

Next, the first shutter member 710 connected to the first link connection member 610 may move in the fourth direction (the DD arrow direction), and the second shutter member 720 connected to the second link connection member 620 may move in the third direction (the UD arrow direction).

In this case, because the first link connection member 610 moves in the fourth direction (the DD arrow direction) in a state of being inserted into the link moving hole 210, it may be guided for the first shutter member 710 to move in the fourth direction (the DD arrow direction). Because the second link connection member 620 moves in the third direction (the UD arrow direction) in a state of being inserted into the link moving hole 210, the second shutter member 720 may be guided to move in the third direction (the UD arrow direction).

In addition, the first shutter guide member 810 may move along with movement of the first shutter member 710 in the fourth direction (the DD arrow direction) in a state of being inserted into the shutter guide hole 220. The second shutter guide member 820 may move along with movement of the second shutter member 720 in the third direction (the UD arrow direction) in a state of being inserted into the shutter guide hole 220. Accordingly, movement of the first shutter member 710 and the second shutter member 720 in the second axial direction (the Y-axis direction) may be guided by the first and second shutter guide members 810 and 820.

By a process described above, at least a part of the access space S may be opened by the shutter 700.

Figure 8:
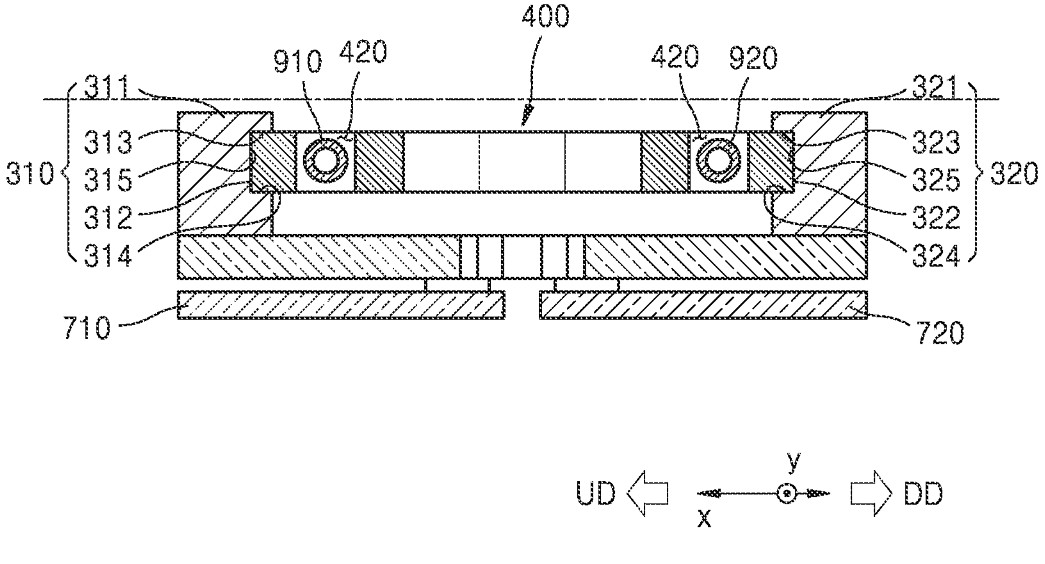
FIG. 8 is a side cross-sectional view, taken along line I-I' of FIG. 5, of the shutter open-closing apparatus according to an embodiment.

FIG. 8 is a side cross-sectional view, taken along line I-I' of FIG. 5, of the shutter open-closing apparatus 100 according to an embodiment. Components of the shutter open-closing apparatus 100 according to an embodiment shown in FIG. 8 are the same as described above, and thus, components not shown with reference numerals above are described with reference to FIG. 8. In addition, FIG. 8 shows a structure of the first guide supporter 310, the second guide supporter 320, the shutter pushing unit 400, the first shutter member 710, and the second shutter member 720.

Referring to FIG. 8, the first guide supporter 310 may include a first guide body 311 and a first pusher insertion groove 312.

The first guide body 311 may be at one side of the shutter pushing unit 400. The first guide body 311 may function as a main body of the first guide supporter 310. The first guide body 311 may be coupled to the main body 200.

The first pusher insertion groove 312 may be formed in an inner surface of the first guide body 311. The one side of the shutter pushing unit 400 may be inserted into the first pusher insertion groove 312. Movement of the shutter pushing unit 400 in the first axial direction (the X-axis direction) may be guided in a state in which the shutter pushing unit 400 is inserted into the first pusher insertion groove 312.

The first guide supporter 310 may further include a first guide upper surface 313, a first guide lower surface 314, and a first guide side surface 315.

The first guide upper surface 313 may be one inner surface of the first guide body 311 facing the first pusher insertion groove 312. In a state in which the shutter pushing unit 400 is inserted into the first pusher insertion groove 312, the first guide upper surface 313 may be at an upper side of the shutter pushing unit 400.

The first guide lower surface 314 may be one inner surface of the first guide body 311, facing the first guide upper surface 313. In a state in which the shutter pushing unit 400 is inserted into the first pusher insertion groove 312, the first guide lower surface 314 may be at a lower side of the shutter pushing unit 400.

The first guide side surface 315 may be one inner surface of the first guide body 311, connected to the first guide upper surface 313 and the first guide lower surface 314. In a state in which the shutter pushing unit 400 is inserted into the first pusher insertion groove 312, the first guide side surface 315 may be at a side surface of the shutter pushing unit 400.

According to the shutter open-closing apparatus 100 according to an embodiment, the shutter pushing unit 400 may move in the first axial direction (the X-axis direction) in a state of being supported by each of the first guide upper surface 313, the first guide lower surface 314, and the first guide side surface 315. Therefore, the shutter pushing unit 400 may safely move without escaping from the first guide supporter 310.

Referring to FIG. 8, the second guide supporter 320 may include a second guide body 321 and a second pusher insertion groove 322.

The second guide body 321 may be at the other side of the shutter pushing unit 400. The second guide body 321 may function as a main body of the second guide supporter 320. The second guide body 321 may be coupled to the main body 200.

The second pusher insertion groove 322 may be formed on an inner surface of the second guide body 321. The other side of the shutter pushing unit 400 may be inserted into the second pusher insertion groove 322. Movement of the shutter pushing unit 400 in the first axial direction (the X-axis direction) may be guided in a state in which the shutter pushing unit 400 is inserted into the second pusher insertion groove 322.

The second guide supporter 320 may further include a second guide upper surface 323, a second guide lower surface 324, and a second guide side surface 325.

The second guide upper surface 323 may be one inner surface of the second guide body 321 facing the second pusher insertion groove 322. In a state in which the shutter pushing unit 400 is inserted into the second pusher insertion groove 322, the second guide upper surface 323 may be at an upper side of the shutter pushing unit 400.

The second guide lower surface 324 may be one inner surface of the second guide body 321, facing the second guide upper surface 323. In a state in which the shutter pushing unit 400 is inserted into the second pusher insertion groove 322, the second guide lower surface 324 may be at a lower side of the shutter pushing unit 400.

The second guide side surface 325 may be one inner surface of the second guide body 321, connected to the second guide upper surface 323 and the second guide lower surface 324. In a state in which the shutter pushing unit 400 is inserted into the second pusher insertion groove 322, the second guide side surface 325 may be at a side surface of the shutter pushing unit 400.

According to the shutter open-closing apparatus 100 according to an embodiment, the shutter pushing unit 400 may move in the first axial direction (the X-axis direction) in a state of being supported by each of the second guide upper surface 323, the second guide lower surface 324, and the second guide side surface 325. Therefore, the shutter pushing unit 400 may safely move without escaping from the second guide supporter 320.

Figure 9:
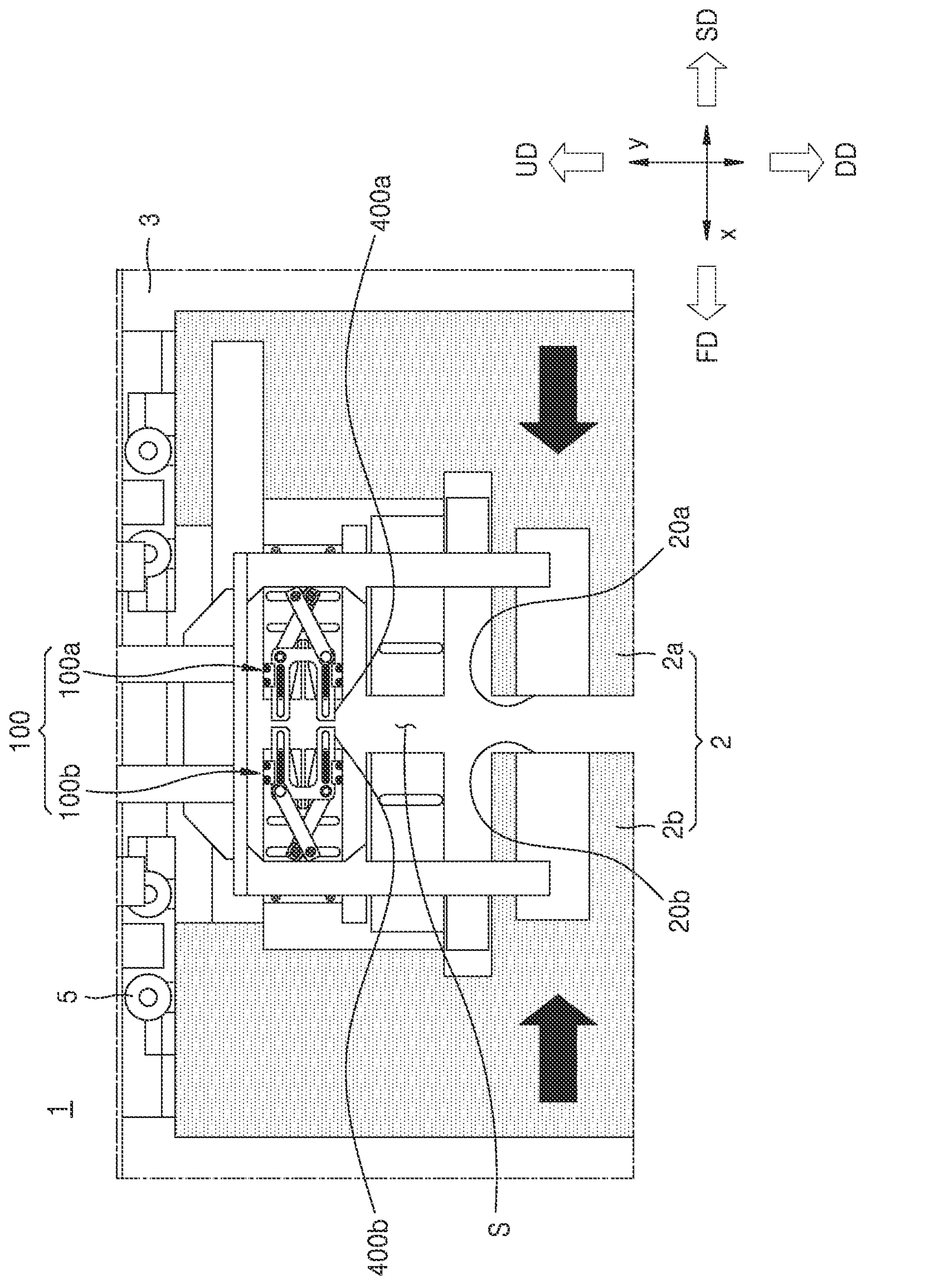
FIG. 9 is a front view of the shutter open-closing system according to an embodiment, illustrating that a main door moves to close an access space.
Figure 10:
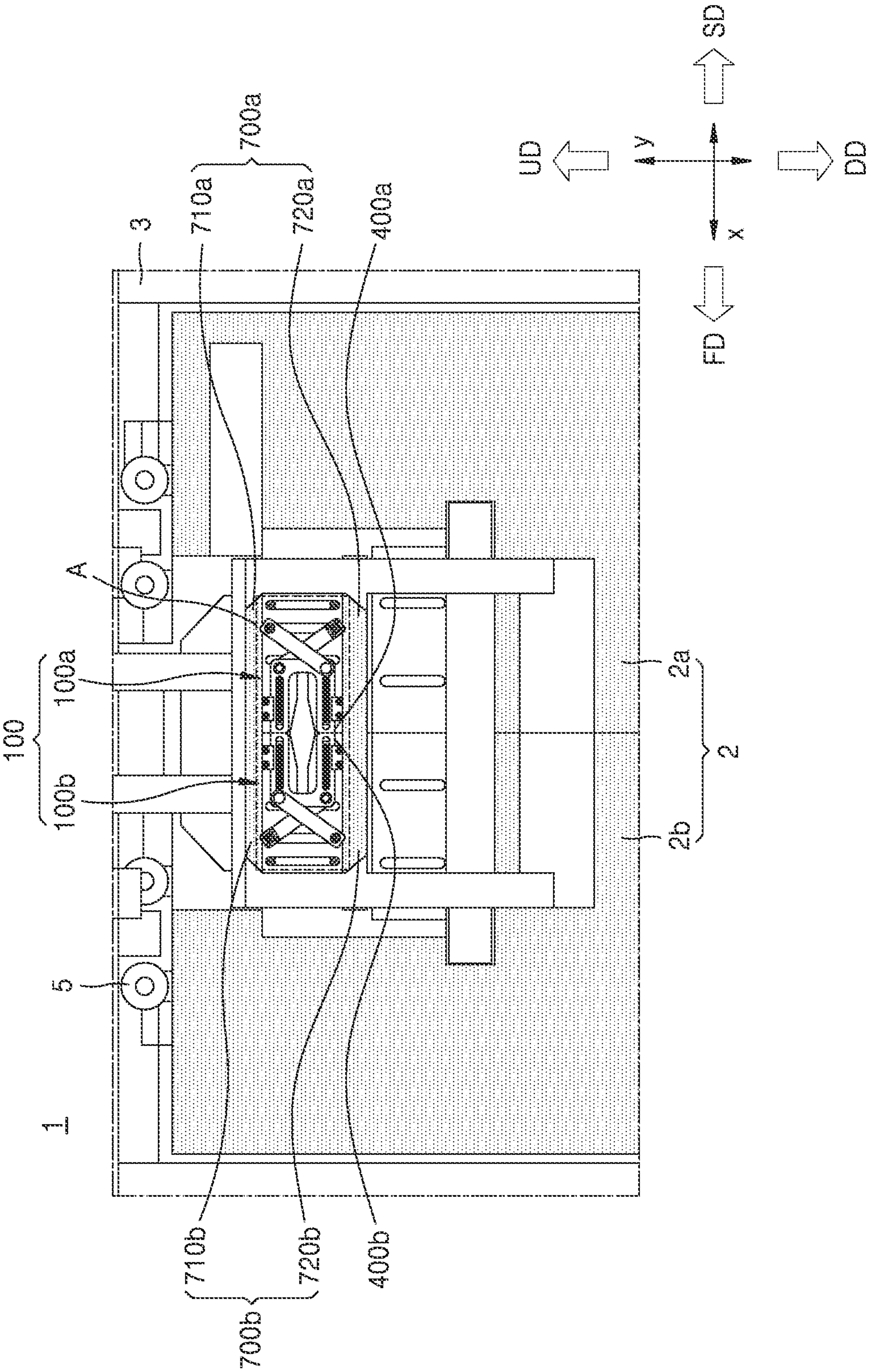
FIG. 10 is a front view of the shutter open-closing system according to an embodiment, illustrating that the access space is closed.

FIG. 9 is a front view of the shutter open-closing system 1 according to an embodiment, illustrating that the main door 2 moves to close the access space S, and FIG. 10 is a front view of the shutter open-closing system 1 according to an embodiment, illustrating that the access space S is closed.

Figure 11:
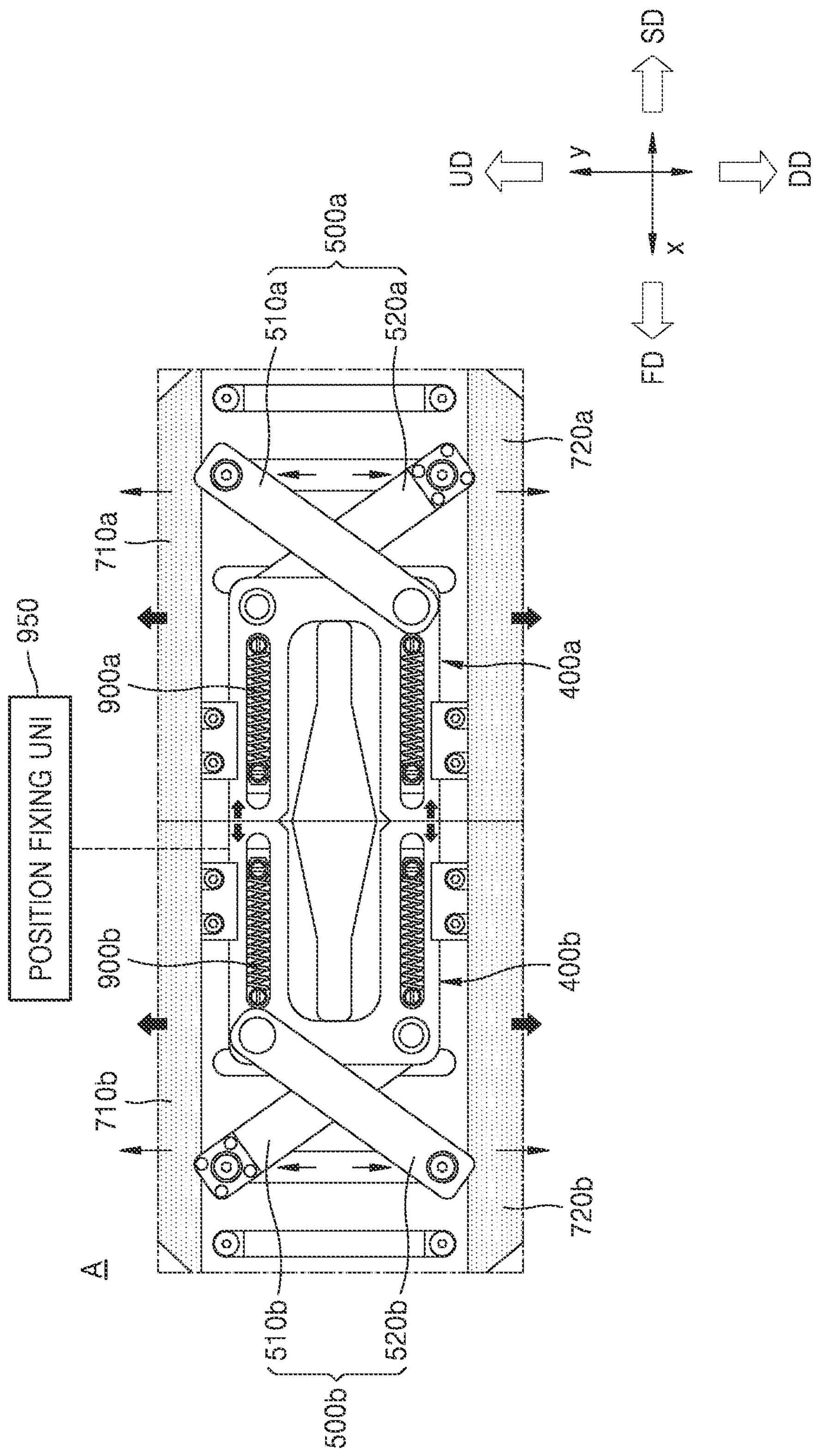
FIG. 11 is a magnified view of a part A of FIG. 10.
Figure 12:
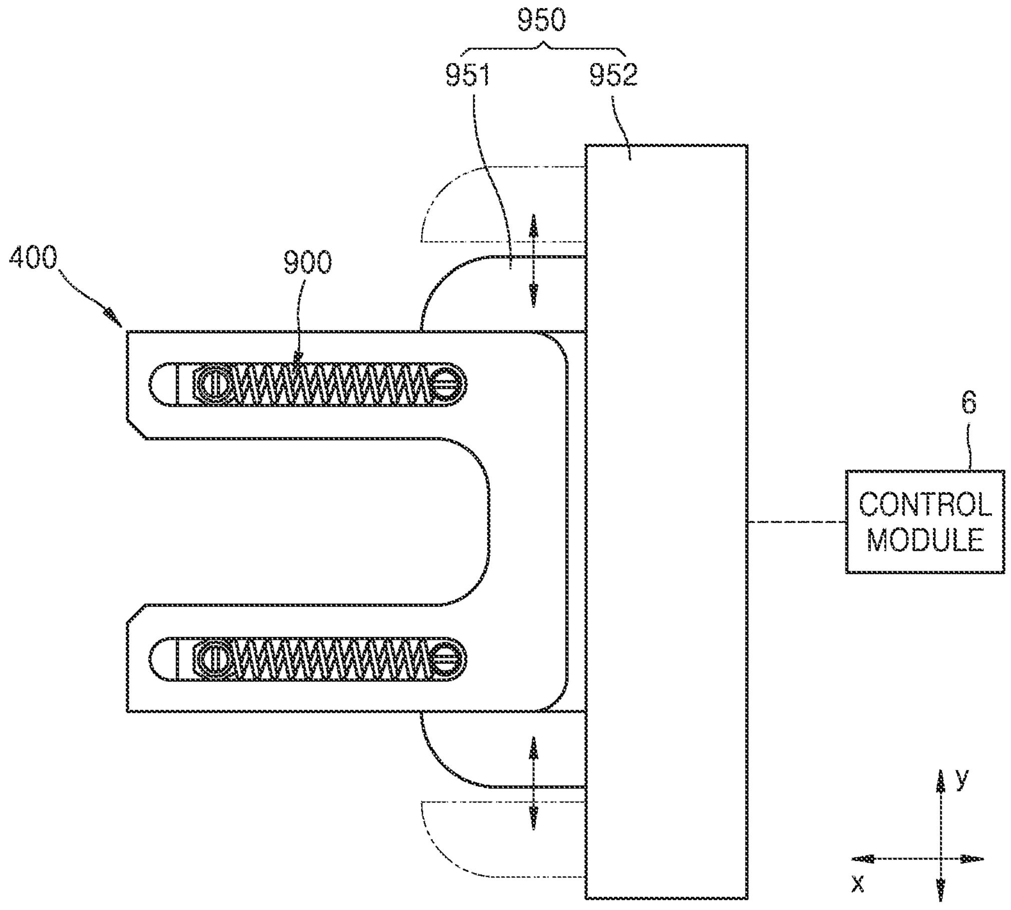
FIG. 12 is a front view of a position fixing unit.

FIG. 11 is a magnified view of a part A of FIG. 10, and FIG. 12 is a front view of a position fixing unit 950.

Figure 13:
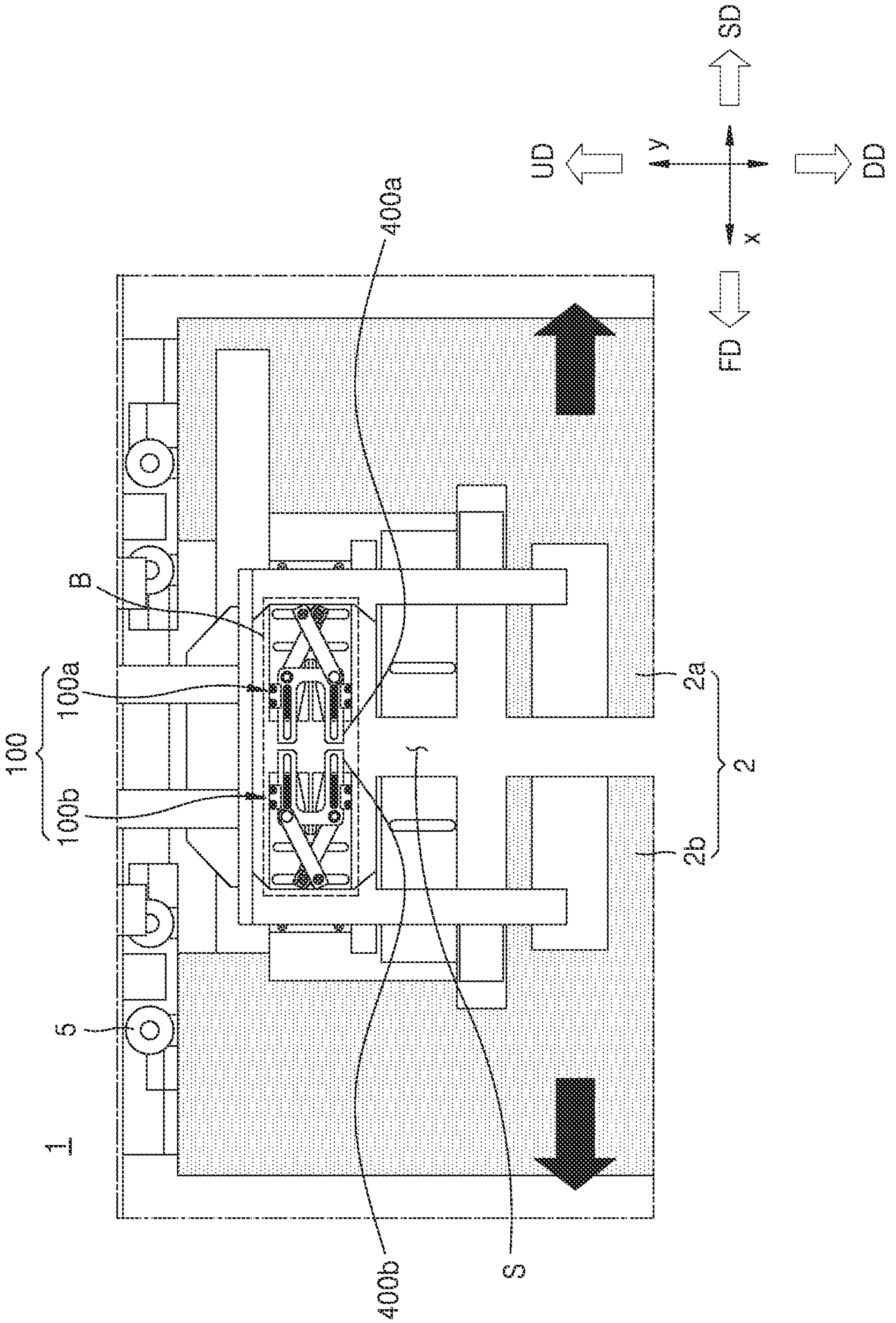
FIG. 13 is a front view of the shutter open-closing system according to an embodiment, illustrating that the access space starts to be opened by a shutter pushing unit.
Figure 14:
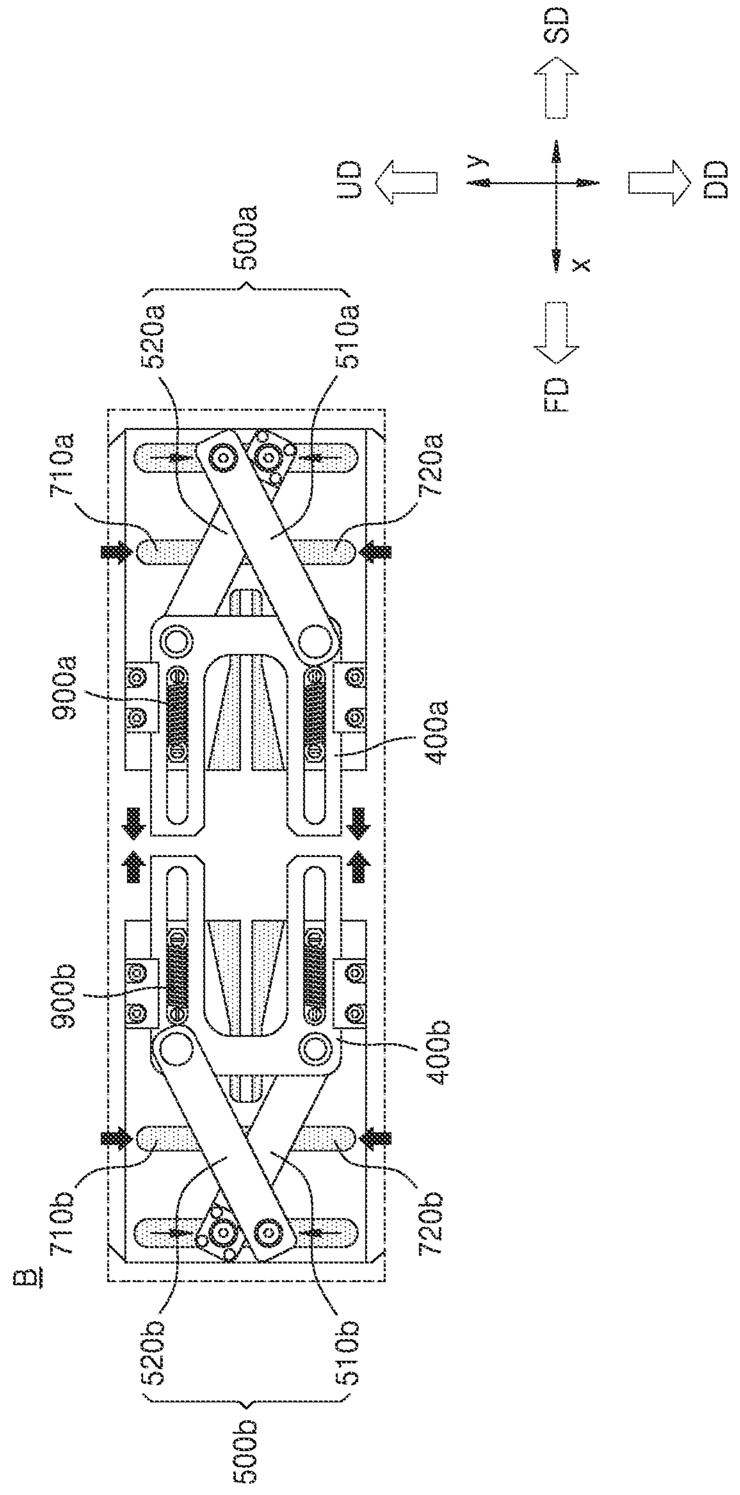
FIG. 14 is a magnified view of a part B of FIG. 13.

FIG. 13 is a front view of the shutter open-closing system 1 according to an embodiment, illustrating that the access space S starts to be opened by the shutter pushing unit 400, and FIG. 14 is a magnified view of a part B of FIG. 13.

Figure 15:
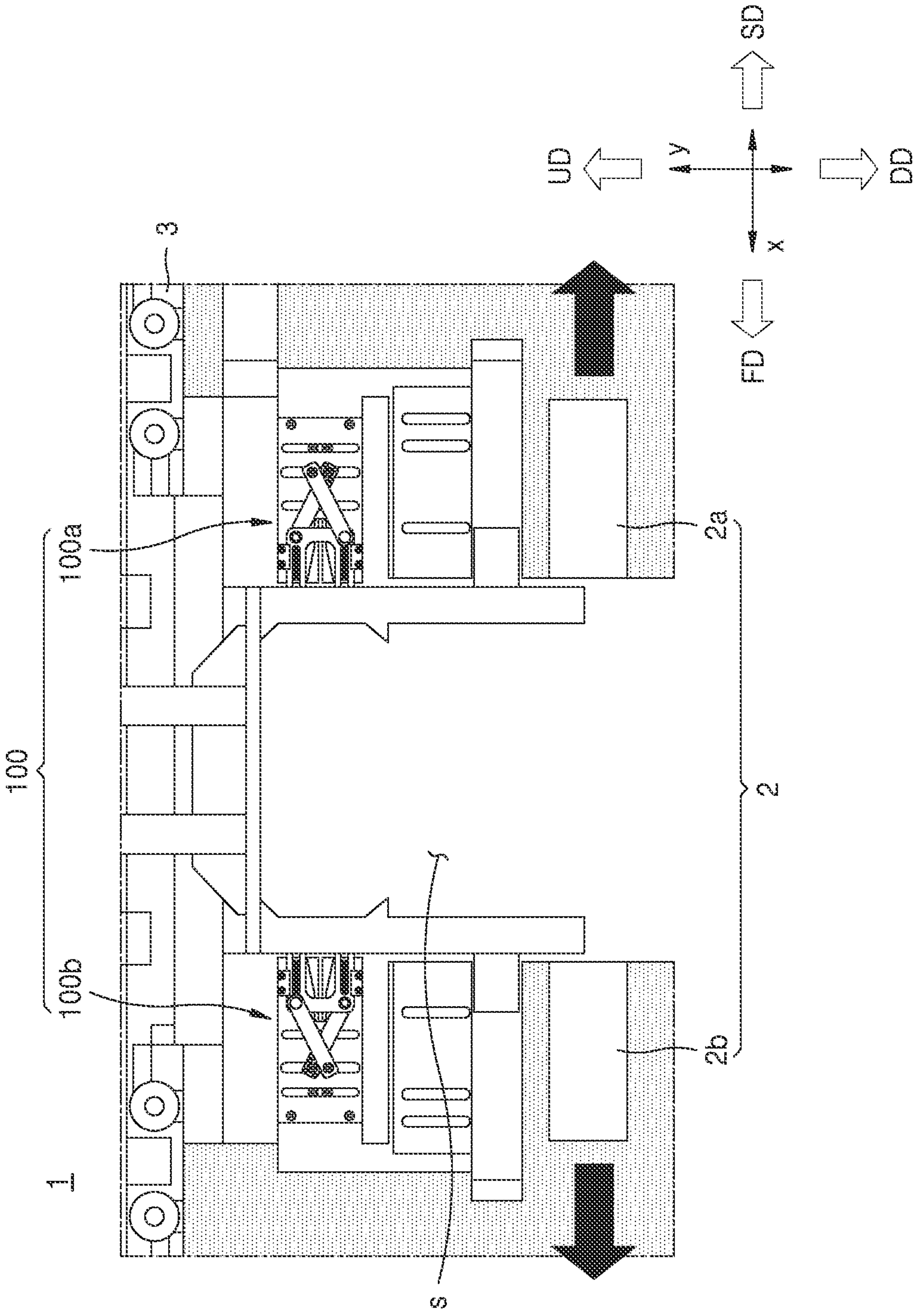
FIG. 15 is a front view of the shutter open-closing system according to an embodiment, illustrating that a shutter returns to an initial position, and the access space is opened.

FIG. 15 is a front view of the shutter open-closing system 1 according to an embodiment, illustrating that a shutter returns to an initial position, and the access space S is opened.

Hereinafter, an operating process of the shutter open-closing system 1 according to an embodiment is described with reference to FIGS. 9 to 15. However, in FIGS. 9 to 11 and 12 to 15, hatching is applied to the first and second main doors 2*a* and 2*b* and first and second shutters 700*a* and 700*b* not to indicate a cross-section but to distinguish components.

First, referring to FIG. 9, in a state in which the access space S of the main frame 3 is opened, the first main door 2*a* and the second main door 2*b* may move in opposite directions along the first axial direction (the X-axis direction) by the main driving unit. Because the first shutter open-closing apparatus 100*a* is connected to the first main door 2*a*, the first shutter open-closing apparatus 100*a* may move together with the first main door 2*a* by a driving force of the main driving unit 4 configured to drive the first main door 2*a*. In addition, because the second shutter open-closing apparatus 100*b* is connected to the second main door 2*b*, the second shutter open-closing apparatus 100*b* may move together with the second main door 2*b* by a driving force of the main driving unit 4 configured to drive the second main door 2*b*. In an embodiment, the first shutter open-closing apparatus 100*a* may move in the first direction (the FD arrow direction) to close the access space S, and the second shutter open-closing apparatus 100*b* may also move in the second direction (the SD arrow direction).

In the shutter open-closing system 1 according to an embodiment, in a state in which a first shutter pushing unit 400*a* is separated from a second shutter pushing unit 400*b*, the first shutter pushing unit 400*a* may be positioned to protrude toward the second shutter pushing unit 400*b* from an end portion 20*a* of the first main door 2*a* (hereinafter, referred to as “a protruding position of the first shutter pushing unit 400*a*”). In addition, in the state in which the first shutter pushing unit 400*a* is separated from the second shutter pushing unit 400*b*, the second shutter pushing unit 400*b* may be positioned to protrude toward the first shutter pushing unit 400*a* from an end portion 20*b* of the second main door 2*b* (hereinafter, referred to as "a protruding position of the second shutter pushing unit 400*b*").

A comparative example in which the first shutter pushing unit 400*a* and the second shutter pushing unit 400*b* are not positioned at their respective protruding positions of the first and second shutter pushing unit 400*a* and 400*b* in the state in which the first shutter pushing unit 400*a* is separated from the second shutter pushing unit 400*b* has a structure in which first and second link units cannot operate even if the first main door 2*a* is contact with the second main door 2*b*. The comparative example has a structure in which the first shutter pushing unit 400*a* and the second shutter pushing unit 400*b* cannot move in the first axial direction (the X-axis direction) because the first shutter pushing unit 400*a* is not in contact with the second shutter pushing unit 400*b* even if the first main door 2*a* and the second main door 2*b* are closed. Therefore, the comparative example cannot move the first shutter and the second shutter by a driving force for moving the first main door 2*a* and the second main door 2*b*.

The shutter open-closing system 1 according to an embodiment is implemented by a structure in which the first shutter pushing unit 400*a* and the second shutter pushing unit 400*b* may move each other when the first main door 2*a* is in contact with the second main door 2*b* because the first shutter pushing unit 400*a* and the second shutter pushing unit 400*b* are positioned at their respective protruding positions. Therefore, the shutter open-closing system 1 according to an embodiment may move the first shutter 700*a* and the second shutter 700*b* by only a driving force for moving the first main door 2*a* and the second main door 2*b*, and thus, the case of an operation for opening and closing the access space S may be improved.

Next, referring to FIGS. 10 and 11, the first main door 2*a* and the second main door 2*b* may move in opposite directions and be in contact with each other to close at least a part of the access space S. The first shutter pushing unit 400*a* and the first shutter 700*a* may move in the first direction (the FD arrow direction) together with the first main door 2*a*, and the second shutter pushing unit 400*b* and the second shutter 700*b* may move in the second direction (the SD arrow direction) together with the second main door 2*b*.

As described above, because the first shutter pushing unit 400*a* and the second shutter pushing unit 400*b* are positioned at their protruding positions and are thus in contact with each other, the first shutter pushing unit 400*a* and the second shutter pushing unit 400*b* may move in opposite directions after the contact. After the first shutter pushing unit 400*a* is in contact with the second shutter pushing unit 400*b*, the first shutter pushing unit 400*a* may move in the second direction (the SD arrow direction) by the second shutter pushing unit 400*b*, and the second shutter pushing unit 400*b* may move in the first direction (the FD arrow direction) by the first shutter pushing unit 400*a*.

The first shutter pushing unit 400*a* may drive the first link unit 500*a* by moving in the second direction (the SD arrow direction). When the first link unit 500*a* is driven, the first shutter 700*a* may move in the second axial direction (the Y-axis direction). A first link member 510*a* of the first link unit 500*a* may move a first shutter member 710*a* of the first shutter 700*a* in the third direction (the UD arrow direction), and a second link member 520*a* of the first link unit 500*a* may move a second shutter member 720*a* of the first shutter 700*a* in the fourth direction (the DD arrow direction).

The second shutter pushing unit 400*b* may drive the second link unit 500*b* by moving in the first direction (the FD arrow direction). When the second link unit 500*b* is driven, the second shutter 700*b* may move in the second axial direction (the Y-axis direction). A first link member 510*b* of the second link unit 500*b* may move a first shutter member 710*b* of the second shutter 700*b* in the third direction (the UD arrow direction), and a second link member 520*b* of the second link unit 500*b* may move a second shutter member 720*b* of the second shutter 700*b* in the fourth direction (the DD arrow direction).

By a process described above, the access space S may be closed by the first and second main doors 2*a* and 2*b* and the first and second shutters 700*a* and 700*b*.

However, according to the movement of the first shutter pushing unit 400*a* in the second direction (the SD arrow direction), a length of a first elastic unit 900*a* may increase, and thus, the first elastic unit 900*a* may provide a restoring force by an elastic force to the first shutter pushing unit 400*a* in the first direction (the FD arrow direction). In addition, according to the movement of the second shutter pushing unit 400*b* in the first direction (the FD arrow direction), a length of a second elastic unit 900*b* may increase, and thus, the second elastic unit 900*b* may provide a restoring force by an elastic force to the second shutter pushing unit 400*b* in the second direction (the SD arrow direction).

Referring to FIG. 12, the shutter open-closing system 1 according to an embodiment may further include a position fixing unit 950. The position fixing unit 950 may fix position of the shutter pushing unit 400. After the first shutter pushing unit 400*a* is in contact with the second shutter pushing unit 400*b*, the first and second elastic units 900*a* and 900*b* may provide a restoring force by an elastic force to the first and second shutter pushing units 400*a* and 400*b*, respectively. Therefore, because the first and second shutter pushing units 400*a* and 400*b* try to move to their initial positions due to the restoring force, there may be a risk that the first and second main doors 2*a* and 2*b* and the first and second shutters 700*a* and 700*b* are opened as soon as the access space S is closed.

The position fixing unit 950 may fix the positions of the first shutter pushing unit 400*a* and the second shutter pushing unit 400*b* to maintain a state in which the access space S is closed even if there is the restoring force by the first and second elastic units 900*a* and 900*b*. Therefore, the shutter open-closing system 1 according to an embodiment may prevent a risk that the access space S is opened by the first and second elastic units 900*a* and 900*b* when fire breaks out.

The position fixing unit 950 may include a clamping mechanism 951 and a clamping main body 952 arranged for the clamping mechanism 951 to be movable thereon. The clamping mechanism 951 may fix a position of the shutter pushing unit 400 by fixing both side surfaces of the shutter pushing unit 400. The clamping mechanism 951 may move in the second axial direction (the Y-axis direction). A control module 6 of the shutter open-closing system 1 according to an embodiment may control movement of the clamping mechanism 951.

In an embodiment, if fire breaks out, the control module 6 may detect a state in which the first shutter pushing unit 400*a* is in contact with the second shutter pushing unit 400*b*, and fix a position of at least one of the first shutter pushing unit 400*a* and the second shutter pushing unit 400*b*.

In addition, after a preset time elapses since fire broke out, or when it is detected that a temperature of the inside of the access space S is less than or equal to a preset temperature, the control module 6 may release the position of the at least one of the first shutter pushing unit 400*a* and the second shutter pushing unit 400*b*.

Next, referring to FIGS. 13 to 15, in a state in which the access space S of the main frame 3 is closed, the first main door 2*a* and the second main door 2*b* may move in opposite directions along the first axial direction (the X-axis direction) by the main driving unit 4. In this case, because the first shutter open-closing apparatus 100*a* is connected to the first main door 2*a*, the first shutter open-closing apparatus 100*a* may move together with the first main door 2*a* by a driving force of the main driving unit 4 configured to drive the first main door 2*a*. In addition, because the second shutter open-closing apparatus 100*b* is connected to the second main door 2*b*, the second shutter open-closing apparatus 100*b* may move together with the second main door 2*b* by a driving force of the main driving unit 4 configured to drive the second main door 2*b*. In an embodiment, the first shutter open-closing apparatus 100*a* may move in the second direction (the SD arrow direction) to open the access space S, and the second shutter open-closing apparatus 100*b* may also move in the first direction (the FD arrow direction).

When the first shutter pushing unit 400*a* is separated from the second shutter pushing unit 400*b* from a contact state, the first elastic unit 900*a* may return the first shutter pushing unit 400*a* to the initial position of the first shutter pushing unit 400*a*. In this case, the first elastic unit 900*a* may move the first shutter pushing unit 400*a* in the first direction (the FD arrow direction). Accordingly, the first shutter pushing unit 400*a* may drive the first link unit 500*a* to move the first shutter 700*a* in the second axial direction (the Y-axis direction).

That is, the first shutter pushing unit 400*a*, the first link unit 500*a*, and the first shutter 700*a* may be sequentially driven by a restoring force by an elastic force of the first elastic unit 900*a*. The first link member 510*a* of the first link unit 500*a* may move the first shutter member 710*a* of the first shutter 700*a* in the fourth direction (the DD arrow direction), and the second link member 520*a* of the first link unit 500*a* may move the second shutter member 720*a* of the first shutter 700*a* in the third direction (the UD arrow direction).

In addition, if the first shutter pushing unit 400*a* is separated from the second shutter pushing unit 400*b* from the contact state, the second clastic unit 900*b* may return the second shutter pushing unit 400*b* to the initial position of the second shutter pushing unit 400*b*. In this case, the second elastic unit 900*b* may move the second shutter pushing unit 400*b* in the second direction (the SD arrow direction). Accordingly, the second shutter pushing unit 400*b* may drive the second link unit 500*b* to move the second shutter 700*b* in the second axial direction (the Y-axis direction).

That is, the second shutter pushing unit 400*b*, the second link unit 500*b*, and the second shutter 700*b* may be sequentially driven by a restoring force by an elastic force of the second clastic unit 900*b*. The first link member 510*b* of the second link unit 500*b* may move the first shutter member 710*b* of the second shutter 700*b* in the fourth direction (the DD arrow direction), and the second link member 520*b* of the second link unit 500*b* may move the second shutter member 720*b* of the second shutter 700*b* in the third direction (the UD arrow direction).

By a process described above, the access space S may be opened as shown in FIG. 15 by the first and second main doors 2*a* and 2*b* and the first and second shutters 700*a* and 700*b*.

In another embodiment, the first main door 2*a* and the second main door 2*b* may be opened not by the main driving unit 4 but using a repulsive force applied in opposite directions in a state in which the first shutter pushing unit 400*a* is in contact with the second shutter pushing unit 400*b*.

Herein, the repulsive force indicates that a restoring force provided to the first shutter pushing unit 400*a* by the first elastic unit 900*a* and a restoring force provided to the second shutter pushing unit 400*b* by the second elastic unit 900*b* are applied in opposite directions.

In a state in which the first shutter pushing unit 400*a* is in contact with the second shutter pushing unit 400*b*, the first elastic unit 900*a* may provide a restoring force by an elastic force to the first shutter pushing unit 400*a* in the first direction (the FD arrow direction). Herein, because the first shutter pushing unit 400*a* is in contact with the second shutter pushing unit 400*b*, it may be considered that the second shutter pushing unit 400*b* receives an external force in the first direction (the FD arrow direction) by the first shutter pushing unit 400*a*. Therefore, the second shutter pushing unit 400*b* may move in the first direction (the FD arrow direction) by the first shutter pushing unit 400*a*, and the second main door 2*b* may also move in the first direction (the FD arrow direction).

In addition, in the state in which the first shutter pushing unit 400*a* is in contact with the second shutter pushing unit 400*b*, the second elastic unit 900*b* may provide a restoring force by an elastic force to the second shutter pushing unit 400*b* in the second direction (the SD arrow direction). Herein, because the second shutter pushing unit 400*b* is in contact with the first shutter pushing unit 400*a*, it may be considered that the first shutter pushing unit 400*a* receives an external force in the second direction (the SD arrow direction) by the second shutter pushing unit 400*b*. Therefore, the first shutter pushing unit 400*a* may move in the second direction (the SD arrow direction) by the second shutter pushing unit 400*b*, and the first main door 2*a* may also move in the second direction (the SD arrow direction).

Even by another embodiment described above, the access space S may be opened as shown in FIG. 15 by the first and second main doors 2*a* and 2*b* and the first and second shutters 700*a* and 700*b*. In addition, in the shutter open-closing system 1 according to another embodiment, the position fixing unit 950 according to an embodiment may also be applied.

Figure 16:
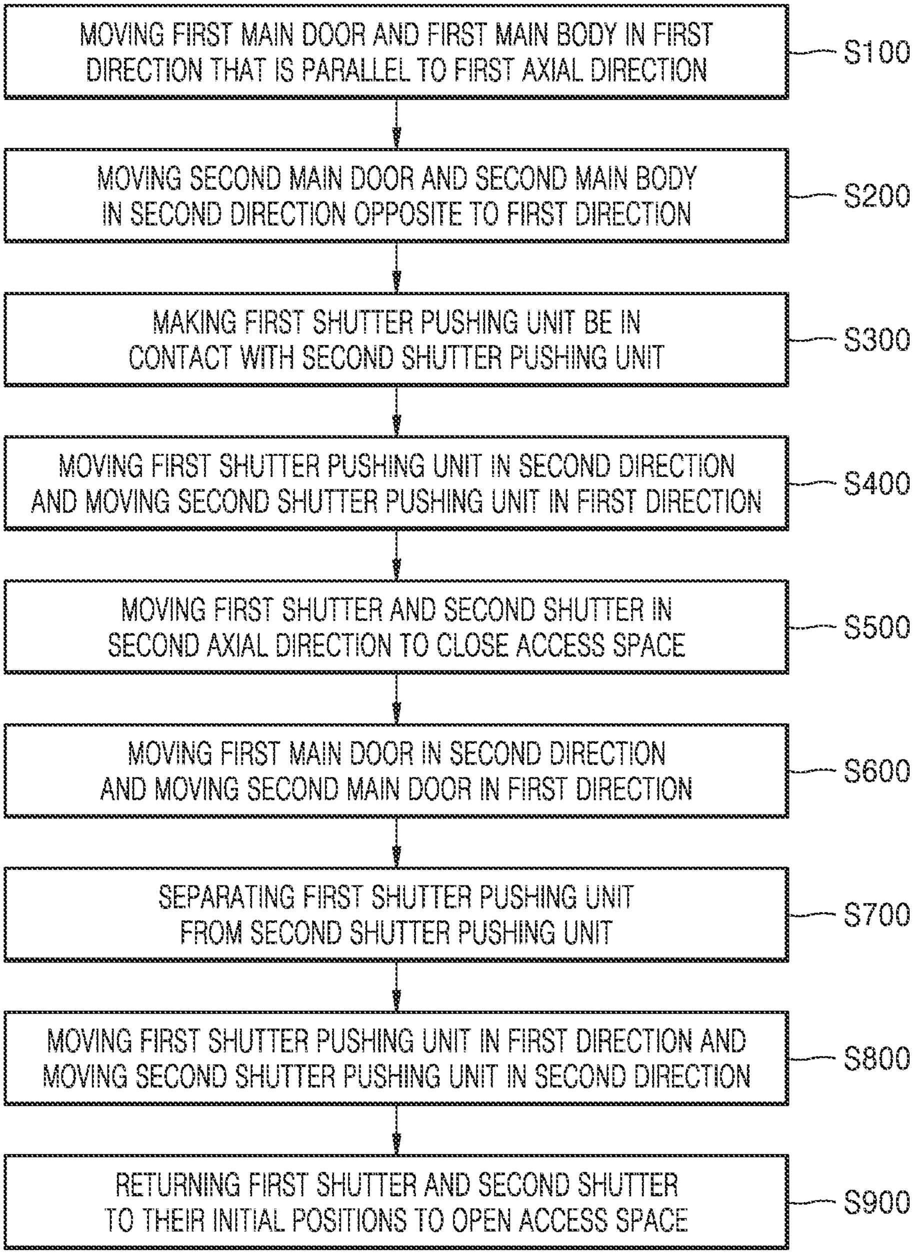
FIG. 16 is a flowchart of a shutter open-closing method according to an embodiment.

FIG. 16 is a flowchart of a shutter open-closing method according to an embodiment.

Hereinafter, the shutter open-closing method according to an embodiment is described with reference to the accompanying drawings.

Referring to FIG. 16, the shutter open-closing method according to an embodiment may include following operations.

First, in a state in which the access space S is opened, first operation S100 of moving the first main door 2*a* and a first main body in the first direction (the FD arrow direction) may be performed. First operation S100 may be performed by the main driving unit 4. First operation S100 may be performed by the main driving unit 4 moving the first main door 2*a* in the first direction (the FD arrow direction). Because the first main body is connected to the first main door 2*a*, the first main body may move along with movement of the first main door 2*a*.

Next, second operation S200 of moving the second main door 2*b* and a second main body in the second direction (the SD arrow direction) may be performed. Second operation S200 may be performed by the main driving unit 4. Second operation S200 may be performed by the main driving unit 4 moving the second main door 2*b* in the second direction (the SD arrow direction). Because the second main body is connected to the second main door 2*b*, the second main body may move along with movement of the second main door 2*b*.

Second operation S200 and first operation S100 may be performed sequentially in any order or simultaneously.

Next, third operation S300 of making the first shutter pushing unit 400*a* be in contact with the second shutter pushing unit 400*b* may be performed. Third operation S300 may be performed by moving the first main door 2*a* and the second main door 2*b* toward each other. Third operation S300 may be performed by moving the first main door 2*a* in the first direction (the FD arrow direction) and moving the second main door 2*b* in the second direction (the SD arrow direction). Third operation S300 may be performed by the main driving unit 4.

Next, fourth operation S400 of moving the first shutter pushing unit 400*a* in the second direction (the SD arrow direction) and moving the second shutter pushing unit 400*b* in the first direction (the FD arrow direction) may be performed. Fourth operation S400 may be performed by the second shutter pushing unit 400*b* moving the first shutter pushing unit 400*a* in the second direction (the SD arrow direction) and by the first shutter pushing unit 400*a* moving the second shutter pushing unit 400*b* in the first direction (the FD arrow direction). Fourth operation S400 may be performed by the main driving unit 4.

Next, fifth operation S500 of moving the first shutter 700*a* and the second shutter 700*b* in the second axial direction (the Y-axis direction) may be performed. Fifth operation S500 may be performed by the first shutter pushing unit 400*a* driving the first link unit 500*a* and by the second shutter pushing unit 400*b* driving the second link unit 500*b*.

When fifth operation S500 is performed, the first shutter member 710*a* of the first shutter 700*a* may move in the third direction (the UD arrow direction), and the second shutter member 720*a* of the first shutter 700*a* may move in the fourth direction (the DD arrow direction). In addition, when fifth operation S500 is performed, the first shutter member 710*b* of the second shutter 700*b* may move in the third direction (the UD arrow direction), and the second shutter member 720*b* of the second shutter 700*b* may move in the fourth direction (the DD arrow direction).

Fifth operation S500 may include fixing positions of the first and second shutter pushing units 400*a* and 400*b*.

Third operation S300, fourth operation S400, and fifth operation S500 may be performed sequentially or simultaneously, and at least a part of the access space S may be closed by first to fifth operations S100, S200, S300, S400, and S500.

As described above, according to the shutter open-closing method according to an embodiment, first to fifth operations S100, S200, S300, S400, and S500 may be sequentially performed by a driving force of the main driving unit 4 configured to move the first main door 2*a* and the second main door 2*b*. Therefore, because the shutter open-closing method according to an embodiment may close the shutter 700 by an operation of the main driving unit 4 configured to drive the main door 2, when compared to related art, the case of a work for closing the access space S may be improved.

Next, sixth operation S600 of moving the first main door 2*a* in the second direction (the SD arrow direction) and the second main door 2*b* in the first direction (the FD arrow direction) in a state in which the access space S is closed may be performed. Sixth operation S600 may be performed by, for example, the main driving unit 4. Sixth operation S600 may be performed by, as another example, a repulsive force between the first and second shutter pushing units 400*a* and 400*b*.

When sixth operation S600 is performed, the first shutter open-closing apparatus 100*a* may move in the second direction (the SD arrow direction), and the second shutter open-closing apparatus 100*b* may move in the first direction (the FD arrow direction).

Next, seventh operation S700 of separating the first shutter pushing unit 400*a* from the second shutter pushing unit 400*b* may be performed. Seventh operation S700 may be performed by moving the first main door 2*a* and the second main door 2*b* in directions away from each other. Seventh operation S700 may be performed by moving the first main door 2*a* in the second direction (the SD arrow direction) and moving the second main door 2*b* in the first direction (the FD arrow direction). Seventh operation S700 may be performed by the main driving unit 4.

Next, eighth operation S800 of moving the first shutter pushing unit 400*a* in the first direction (the FD arrow direction) and moving the second shutter pushing unit 400*b* in the second direction (the SD arrow direction) may be performed. Eighth operation S800 may be performed by the first elastic unit 900*a* moving the first shutter pushing unit 400*a* in the first direction (the FD arrow direction) by using a restoring force by an elastic force and by the second elastic unit 900*b* moving the second shutter pushing unit 400*b* in the second direction (the SD arrow direction) by using a restoring force by an elastic force. Eighth operation S800 may be performed by the first and second clastic units 900*a* and 900*b*.

Next, ninth operation S900 of moving the first shutter 700*a* and the second shutter 700*b* to initial positions thereof may be performed. Ninth operation S900 may be performed by the first shutter pushing unit 400*a* driving the first link unit 500*a* and by the second shutter pushing unit 400*b* driving the second link unit 500*b*.

When ninth operation S900 is performed, the first shutter member 710*a* of the first shutter 700*a* may move in the fourth direction (the DD arrow direction), and the second shutter member 720*a* of the first shutter 700*a* may move in the third direction (the UD arrow direction). In addition, when ninth operation S900 is performed, the first shutter member 710*b* of the second shutter 700*b* may move in the fourth direction (the DD arrow direction), and the second shutter member 720*b* of the second shutter 700*b* may move in the third direction (the UD arrow direction).

Sixth operation S600, seventh operation S700, eighth operation S800, and ninth operation S900 may be performed sequentially or simultaneously, and at least a part of the access space S may be opened by sixth to ninth operations S600, S700, S800, and S900.

As described above, according to the shutter open-closing method according to an embodiment, sixth to ninth operations S600, S700, S800, and S900 may be sequentially performed by a driving force of the main driving unit 4 configured to move the first main door 2*a* and the second main door 2*b*. Therefore, because the shutter open-closing method according to an embodiment may open the shutter 700 by only an operation of the main driving unit 4 configured to drive the main door 2, when compared to related art, the ease of a work for closing the access space S may be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A shutter open-closing apparatus comprising:

a main body connected to a main door, which is opened and closed, to move along with movement of the main door;

a main guide unit coupled to the main body;

a shutter pushing unit movable on the main guide unit;

a link unit rotatably connected to the shutter pushing unit to move along with movement of the shutter pushing unit; and a shutter connected to the link unit to move along with movement of the link unit, and opened and closed using a driving force for moving the main door.

2. The shutter open-closing apparatus of claim 1, wherein the main guide unit comprises:

a guide body at a side surface of the shutter pushing unit; and a pusher insertion groove formed in an inner surface of the guide body, wherein the shutter pushing unit is guided to move by being inserted into the pusher insertion groove.

3. The shutter open-closing apparatus of claim 1, wherein the main guide unit comprises:

a first guide supporter at a first side of the shutter pushing unit to support the first side of the shutter pushing unit; and a second guide supporter at a second side of the shutter pushing unit to support the second side of the shutter pushing unit.

4. The shutter open-closing apparatus of claim 1, further comprising an elastic unit provided to the shutter pushing unit to move the shutter pushing unit to an initial position thereof by using a restoring force by an elastic force.

5. The shutter open-closing apparatus of claim 4, wherein a first side of the elastic unit is coupled to the shutter pushing unit, and a second side of the elastic unit is coupled to the main body.

6. The shutter open-closing apparatus of claim 4, wherein the shutter pushing unit comprises an elastic unit insertion portion into which the elastic unit is inserted.

7. The shutter open-closing apparatus of claim 1, wherein the link unit comprises a first link member and a second link member rotatably connected to the shutter pushing unit and the shutter, respectively.

8. The shutter open-closing apparatus of claim 7, wherein movement of the shutter is guided in response to a change in a separation distance between one end of the first link member and one end of the second link member.

9. The shutter open-closing apparatus of claim 7, wherein the shutter comprises:

a first shutter member connected to the first link member to move along with movement of the first link member; and a second shutter member connected to the second link member to move along with movement of the second link member.

10. The shutter open-closing apparatus of claim 9, wherein, when the shutter pushing unit moves toward the link unit, an included angle between the first link member and the second link member increases, and the first shutter member and the second shutter member move in directions away from each other, and when the shutter pushing unit moves away from the link unit, the included angle between the first link member and the second link member decreases, and the first shutter member and the second shutter member move in directions toward each other.

11. The shutter open-closing apparatus of claim 1, further comprising a link connection unit connected to each of the shutter and the link unit to move along with movement of the link unit, thereby moving the shutter.

12. The shutter open-closing apparatus of claim 11, wherein the link connection unit guides the movement of the shutter in a state of being inserted into a link moving hole formed in the main body.

13. The shutter open-closing apparatus of claim 1, further comprising a shutter guide unit connected to the shutter to move along with movement of the shutter.

14. The shutter open-closing apparatus of claim 13, wherein the shutter guide unit moves together with the shutter in a state of being inserted into a shutter guide hole formed in the main body.

15. A shutter open-closing system comprising:

a main frame having an access space formed therein;

a first main door on the main frame to be movable in a first axial direction;

a second main door on the main frame to be movable in the first axial direction;

a first shutter open-closing apparatus comprising a first main body coupled to the first main door to move together with the first main door, a first shutter pushing unit on the first main body to be movable in the first axial direction, a first shutter connected to a first link unit to move in response to an operation of the first link unit connected to the first shutter pushing unit, and a first elastic unit providing a restoring force by an elastic force to the first shutter pushing unit; and a second shutter open-closing apparatus comprising a second main body coupled to the second main door to move together with the second main door, a second shutter pushing unit on the second main body to be movable in the first axial direction, a second shutter connected to a second link unit to move in response to an operation of the second link unit connected to the second shutter pushing unit, and a second elastic unit providing a restoring force by an elastic force to the second shutter pushing unit.

16. The shutter open-closing system of claim 15, wherein, when the first shutter pushing unit is in contact with the second shutter pushing unit from a separated state, the first shutter pushing unit drives the first link unit so that the first shutter closes at least a part of the access space.

17. The shutter open-closing system of claim 15, wherein, in a state in which the first shutter pushing unit is separated from the second shutter pushing unit, the first shutter pushing unit is positioned to protrude toward the second shutter pushing unit from an end portion of the first main door.

18. The shutter open-closing system of claim 15, wherein, when the first shutter pushing unit is separated from the second shutter pushing unit from a contact state, the first elastic unit returns the first shutter pushing unit to an initial position of the first shutter pushing unit, and the first shutter pushing unit moves the first link unit so that the first shutter opens at least a part of the access space.

19. A shutter open-closing method comprising:

moving a first main door, which is opened and closed, and a first main body coupled to the first main door, in a first direction that is parallel to a first axial direction;

moving a second main door, which is opened and closed, and a second main body coupled to the second main door, in a second direction that is opposite to the first direction;

making a first shutter pushing unit on the first main body be in contact with a second shutter pushing unit on the second main body;

moving the first shutter pushing unit in the second direction and moving the second shutter pushing unit in the first direction; and moving a first shutter connected to the first shutter pushing unit, in a second axial direction crossing the first axial direction, and moving a second shutter connected to the second shutter pushing unit, in the second axial direction.

20. The shutter open-closing method of claim 19, further comprising:

moving the first main door in the second direction and moving the second main door in the first direction;

separating the first shutter pushing unit from the second shutter pushing unit;

moving the first shutter pushing unit in the second direction and moving the second shutter pushing unit in the first direction; and returning the first shutter to an initial position thereof and moving the second shutter to an initial position thereof.

* * * * *